(12) United States Patent
Takagi et al.

(10) Patent No.: US 11,163,162 B2
(45) Date of Patent: Nov. 2, 2021

(54) LIGHT CONTROL SHADE FOR TRANSMISSIVE DISPLAY APPARATUS

(71) Applicant: SEIKO EPSON CORPORATION, Tokyo (JP)

(72) Inventors: Masayuki Takagi, Matsumoto (JP); Takahiro Totani, Suwa (JP); Takashi Takeda, Suwa (JP); Akira Komatsu, Tatsuno-machi (JP); Toshiaki Miyao, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/673,010

(22) Filed: Nov. 4, 2019

(65) Prior Publication Data

US 2020/0064638 A1    Feb. 27, 2020

Related U.S. Application Data

(63) Continuation of application No. 15/261,729, filed on Sep. 9, 2016, now abandoned.

(30) Foreign Application Priority Data

Sep. 30, 2015    (JP) ................................ 2015-192905

(51) Int. Cl.
     *G02B 27/01*      (2006.01)
     *F21V 23/04*      (2006.01)

(52) U.S. Cl.
     CPC ...... *G02B 27/0172* (2013.01); *F21V 23/0464* (2013.01); *G02B 2027/0118* (2013.01); *G02B 2027/0178* (2013.01)

(58) Field of Classification Search
None
See application file for complete search history.

(56) References Cited

U.S. PATENT DOCUMENTS 6,900,778 B1    5/2005   Yamamoto
2008/0218434 A1    9/2008   Kelly et al.
(Continued)

FOREIGN PATENT DOCUMENTS

JP    2000-298246 A    10/2000
JP    2005-107125 A    4/2005
(Continued)

OTHER PUBLICATIONS

Mar. 26, 2018 Office Action issued in U.S. Appl. No. 15/261,729.
(Continued)

*Primary Examiner* — Ifedayo B Iluyomade
(74) *Attorney, Agent, or Firm* — Oliff PLC

(57) ABSTRACT

A see-through display apparatus includes an image display apparatus configured to emit a video light, a light guide apparatus configured to guide the video light and to output the video light in a first direction, and a light control shade disposed opposite to the first direction with respect to the light guide apparatus. The light control shade is configured to control a transmittance of an outside light based on a luminance of the outside light. A first response time of the light control shade when the outside light changes from a lower luminance to a higher luminance is slower than a second response time of the light control shade when the outside light changes from the higher luminance to the lower luminance.

9 Claims, 16 Drawing Sheets

(56) References Cited

U.S. PATENT DOCUMENTS

| | | | |
|---|---|---|---|
| 2012/0019493 A1 | 1/2012 | Barnhoefer et al. | |
| 2013/0147859 A1* | 6/2013 | Kobayashi | G02B 27/017 345/690 |
| 2013/0328842 A1* | 12/2013 | Barnhoefer | G06F 3/0443 345/207 |
| 2014/0266989 A1 | 9/2014 | Takahashi et al. | |
| 2014/0340286 A1 | 11/2014 | Machida et al. | |
| 2015/0370075 A1* | 12/2015 | Ato | G02F 1/163 359/240 |
| 2017/0322420 A1 | 11/2017 | Machida et al. | |

FOREIGN PATENT DOCUMENTS

| | | |
|---|---|---|
| JP | 2005-284007 A | 10/2005 |
| JP | 2010-521347 A | 6/2010 |
| JP | 2012-088472 A | 5/2012 |
| JP | 2014-160169 A | 9/2014 |
| WO | 2013/054728 A1 | 4/2013 |
| WO | 2013/111471 A1 | 8/2013 |

OTHER PUBLICATIONS

Jul. 26, 2018 Office Action Issued in U.S. Appl. No. 15/261,729.
Jan. 28, 2019 Office Action issued in U.S. Appl. No. 15/261,729.
Aug. 21, 2019 Office Action Issued in U.S. Appl. No. 15/261,729.
Nov. 7, 2019 Office Action Issued in U.S. Appl. No. 15/261,729.

\* cited by examiner

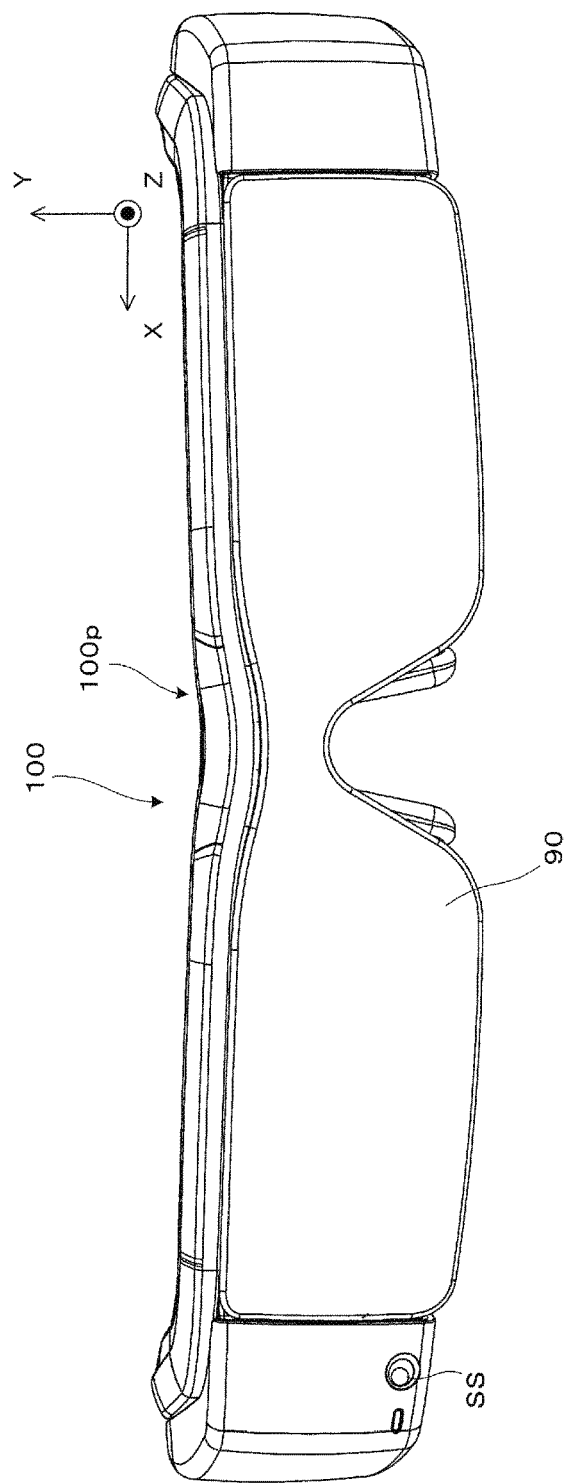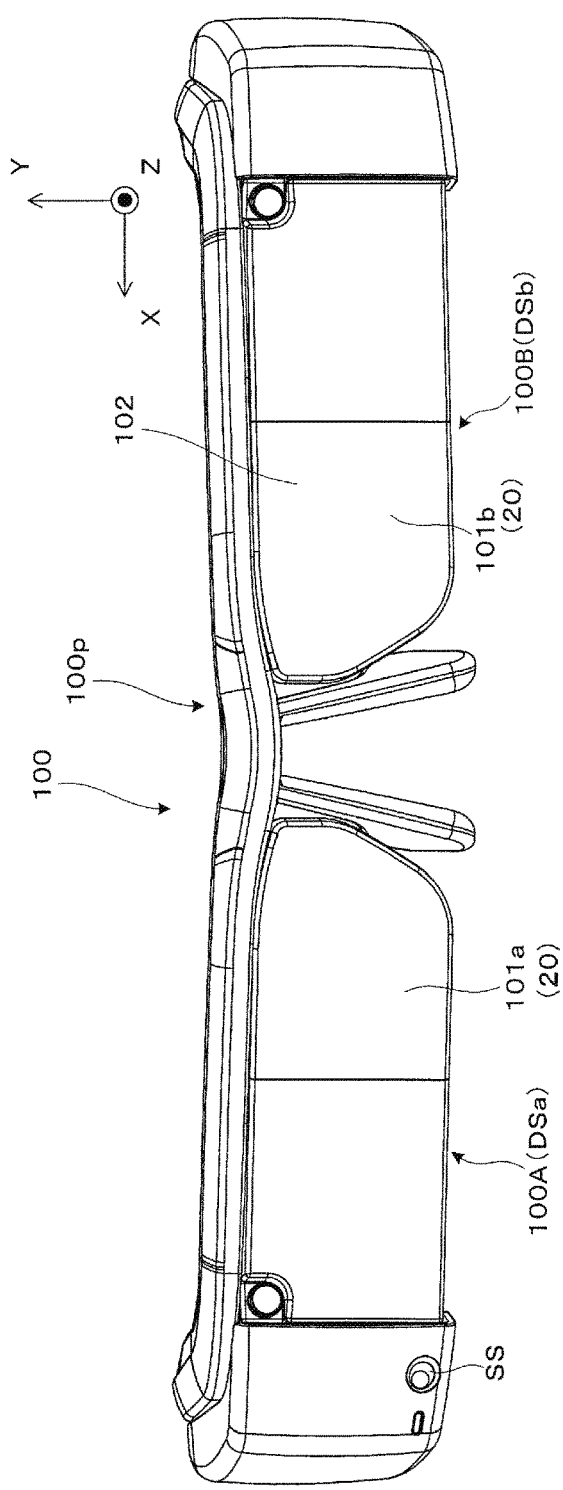
FIG. 3A
FIG. 3B

HORIZONTAL VISUAL FIELD

VERTICAL VISUAL FIELD

VISUAL FIELD PROJECTED ON SURFACE

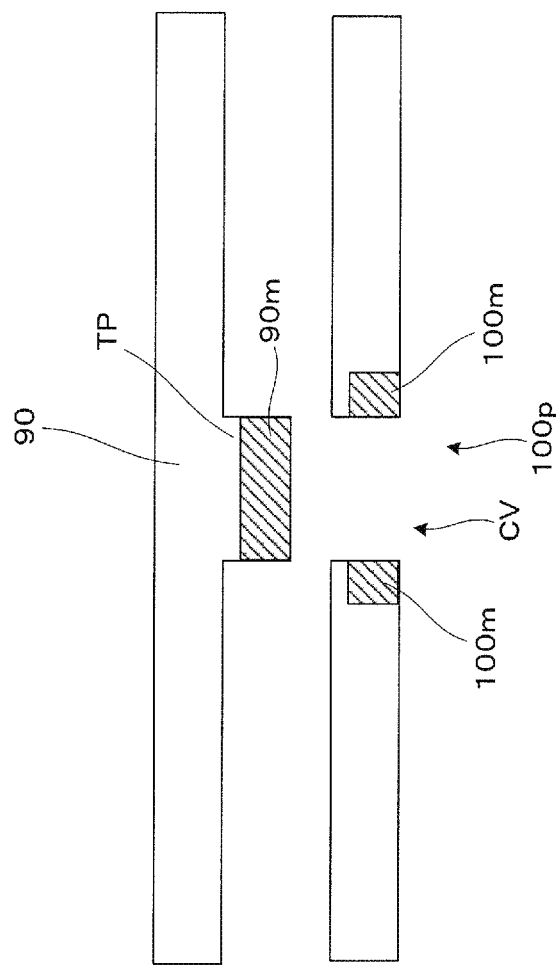
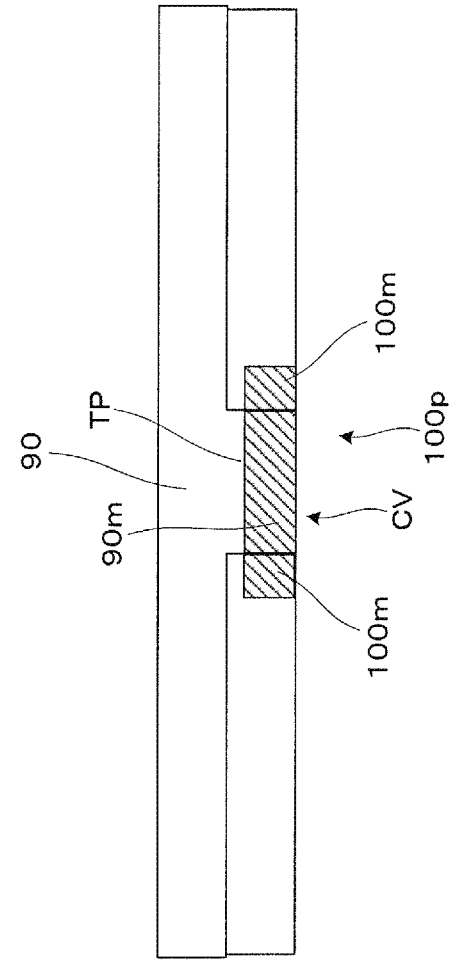

LIGHT CONTROL SHADE FOR TRANSMISSIVE DISPLAY APPARATUS

CROSS-REFERENCE TO RELATED APPLICATION

This application is a continuation application of U.S. patent application Ser. No. 15/261,729, filed on Sep. 9, 2016, which claims priority from Japanese Patent Application No. 2015-192905, filed on Sep. 30, 2015. The disclosure of the foregoing application is hereby incorporated by reference in its entirety.

BACKGROUND

1. Technical Field

The present invention relates to a transmissive display apparatus that presents a viewer with video images formed by an image display apparatus and a light control shade for the transmissive display apparatus.

2. Related Art

A variety of optical systems have been proposed as those incorporated into a display apparatus (virtual image display apparatus), such as a head mounted display (hereinafter also referred to as HMD) mounted on a viewer's head. In particular, there is a known display apparatus called a see-through-type display apparatus (transmissive display apparatus) that superimposes video light and outside light on each other and allows visual recognition of the superimposed light (see JP-A-2014-160169).

As a transmissive display apparatus of the see-through type, there is a known display apparatus that is provided with a light control apparatus for controlling outside light, and the display apparatus controls the light transmittance of the light control apparatus on the basis of a result of measurement of the quantity of light received with a light reception element that receives outside light in such a way that a viewer is unlikely to feel discomfort even when the quantity of incident outside light changes (see JP-A-2014-160169). Further, as display control in an HMD, there is a known HMD that controls the luminance of a display element in accordance with the visual field sensitivity characteristics of a viewer in order to extend the life of the display element (see WO/2013/054728).

In a light control apparatus, a light control shade, and other similar apparatus, too frequent change in transmission could annoy a viewer against the intention. The same holds true for change in luminance of video light. In view of the facts described above, as a typical light control method, for example, it is conceivable, as one of typical approaches, to perform light control in such a way that the transmittance and luminance are changed on the basis of moving average of the amounts of change in outside light quantity. However, when the outside light sharply dims, for example, when the viewer who has been in a bright outdoor place in fair weather moves to a dark indoor place, the method described above, in which the amount of moving average is first calculated and then the transmittance is gradually adjusted, requires time for the adjustment until an optimum light quantity is achieved and could therefore undesirably create, for example, a dangerous situation in which the video light is dominant and the outside is invisible during the period of the adjustment.

SUMMARY

An advantage of some aspects of the invention is to provide a transmissive display apparatus that not only superimposes video light and outside light on each other and allows visual recognition of the superimposed light but also allows visual recognition of the outside in a safer manner. Another advantage of some aspects of the invention is to provide a light control shade for the transmissive display apparatus.

A first transmissive display apparatus according to an aspect of the invention is a transmissive display apparatus that superimposes video light and outside light on each other and allows visual recognition of the superimposed light, the apparatus including a display section that displays the video light, a light control shade that is so provided as to face the display section and controls the outside light, an outside light detection section that detects the outside light, and a light quantity control section that controls transmittance of the light control shade based on a result of the detection performed by the outside light detection section, and the light quantity control section performs quick response control in which response speed of light quantity control in a case where the outside light detection section detects a decrease in quantity of the outside light is made faster than the response speed of the light quantity control in a case where the outside light detection section detects an increase in quantity of the outside light. It is assumed that the quick response control in a case where light quantity control in response to a change in the outside light quantity is performed is so performed that in two types of light quantity control in response to respective changes in the outside light quantity, the response speed of one of the two types of light quantity control is made faster than the response speed of the other light quantity control. Conversely, it is assumed that in the two types of light quantity control in response to respective changes in the outside light quantity, delay control is so performed that the response speed of one of the two types of light quantity control is made slower than the response speed of the other light quantity control.

In the transmissive display apparatus described above, when the outside light detection section detects a decrease in the outside light quantity, the light quantity control section quickly adjusts the transmittance of the light control shade (performs outside light quantity control). As a result, appropriate outside light quantity can be ensured, whereby the outside can be visually recognized in a safer manner.

In a specific aspect of the invention, the light control shade changes outside light transmittance by using electrical drive. In this case, the electrical drive allows active, quick control of adjustment of the outside light transmittance (light quantity control) to be performed.

In another aspect of the invention, the light control shade is formed of an SPD (suspended particle device), an electrochromic device, or a guest-host liquid crystal or polymer dispersed liquid crystal device. In this case, the quick response control can be reliably performed at intended response speed.

In still another aspect of the invention, the light quantity control section performs the quick response control in such a way that a rising period from time when the transmittance of the light control shade is caused to start increasing to time when the increase is completed in the case where the outside light detection section detects a decrease in quantity of the outside light is made shorter than a falling period from time when the transmittance of the light control shade is caused to start decreasing to time when the decrease is completed in the case where the outside light detection section detects an increase in quantity of the outside light. In this case, when a decrease in the outside light quantity is detected, the light quantity control section quickly increases the transmittance of the light control shade so that appropriate outside light quantity is ensured, whereby the outside can be visually recognized in a safer manner.

A second transmissive display apparatus according to an aspect of the invention is a transmissive display apparatus that superimposes video light and outside light on each other and allows visual recognition of the superimposed light, the apparatus including a display section that displays the video light, an outside light detection section that detects the outside light, and a light quantity control section that controls luminance of the display section based on a result of the detection performed by the outside light detection section, and the light quantity control section performs quick response control in which response speed of light quantity control in a case where the outside light detection section detects a decrease in quantity of the outside light is made faster than the response speed of the light quantity control in a case where the outside light detection section detects an increase in quantity of the outside light.

In the transmissive display apparatus described above, when the outside light detection section detects a decrease in the outside light quantity, the light quantity control section quickly adjusts the luminance of the display section (performs video light quantity control). As a result, a situation in which the video light becomes dominant is avoided, whereby the outside can be visually recognized in a safer manner.

In a specific aspect of the invention, the light quantity control section performs the quick response control in such a way that a period for which the luminance of the display section is decreased in the case where the outside light detection section detects a decrease in quantity of the outside light is made shorter than a period for which the luminance of the display section is increased in the case where the outside light detection section detects an increase in quantity of the outside light. In this case, when a decrease in the outside light quantity is detected, the light quantity control section quickly decreases the luminance of the display section. As a result, a situation in which the video light becomes dominant in response to the decrease in the outside light quantity is avoided, whereby the outside can be visually recognized in a safer manner.

In still another aspect of the invention, the light quantity control section performs the quick response control in such a way that response speed in the light quantity control in a case where the outside light detection section detects a decrease in quantity of the outside light that exceeds a threshold in a predetermined period is made faster than the response speed in typical light quantity control based on moving average of changes in quantity of the outside light. In this case, the quick response control is performed when at least a fixed amount of decrease in the outside light quantity is considered to have occurred in a short period, that is, the background is considered to have become abruptly dark. The quick response control can therefore be performed in an adequate situation on the basis of the threshold. Further, in this case, the light quantity control can be performed more quickly than the typical light quantity control in which the luminance of the display section is gradually changed on the basis of moving average of changes in the outside light quantity.

In still another aspect of the invention, the light quantity control section performs the typical light quantity control when the outside light detection section detects no change in the outside light quantity that exceeds the threshold in the predetermined period. In this case, the quick response control is not performed in an inadequate situation on the basis of the threshold, but the typical light quantity control is performed.

In still another aspect of the invention, the light quantity control section performs delay control in which response speed in the light quantity control in a case where the outside light detection section detects an increase in quantity of the outside light that exceeds the threshold in the predetermined period is made slower or equal to the response speed in the typical light quantity control. In this case, the delay control is performed when at least a fixed amount of increase in the outside light quantity is considered to have occurred in a short period, that is, the background is considered to have become abruptly bright. The delay control can therefore be performed in an adequate situation on the basis of the threshold.

In still another aspect of the invention, the outside light detection section has an ambient sensor (ambient light sensor) that senses brightness of the outside light in a direction of a viewer's sight line. In this case, the degree of brightness in the outside (surroundings) can be evaluated on the basis of the sensing performed by the ambient sensor.

In still another aspect of the invention, the outside light detection section has a plurality of ambient sensors and senses the brightness in an upward direction with respect to the viewer as well as in the direction of the viewer's sight line. In this case, the degree of brightness in the outside (surroundings) can be more accurately evaluated on the basis of the sensing performed by the ambient sensors.

In still another aspect of the invention, the outside light detection section has a camera that performs imaging over a detection range of the ambient sensor and/or a vicinity of the detection range to acquire image information, and the light quantity control section determines an amount of control of light quantity based on the image information acquired in the imaging performed by the camera. In this case, the amount of control of light quantity, that is, the amount of adjustment of the transmittance of the light control shade or the amount of adjustment of the luminance of the display section can be more accurately determined on the basis of the image information.

In still another aspect of the invention, the light quantity control section performs the light quantity control over an area wider than a range of a viewer's discrimination visual field. In this case, the light quantity control can be performed over a more accurate range in consideration of the viewer's visual field.

In still another aspect of the invention, the light quantity control section is capable of switching the light quantity control in accordance with an outside light priority mode in which priority is given to visual recognition of the outside light and a video light priority mode in which priority is given to visual recognition of the video light and performs the quick response control when the apparatus operates in the outside light priority mode. In this case, in display action in which priority is given to visual recognition of the outside light, a dangerous situation in which the outside is invisible due to a decrease in the outside light quantity can be avoided.

A light control shade for a transmissive display apparatus according to an aspect of the invention is a light control shade that is so provided as to be attachable and detachable to and from a transmissive display apparatus that includes a display section that displays video light and superimposes the video light and outside light on each other to allow visual recognition of the superimposed light, the light control shade so attached as to face the display section and controlling the outside light incident on the transmissive display apparatus, and the light control shade controls the outside light in such a way that increase in outside light transmittance is faster than decrease in the transmittance.

In the light control shade for a transmissive display apparatus described above, when an outside light detection section detects a decrease in quantity of the outside light, for example, the light control shade quickly adjusts the transmittance thereof (performs outside light quantity control). As a result, appropriate outside light quantity can be ensured, whereby the outside can be visually recognized in a safer manner.

BRIEF DESCRIPTION OF THE DRAWINGS

The invention will be described with reference to the accompanying drawings, wherein like numbers reference like elements.

FIG. 3A is a front view of the transmissive display apparatus with the light control shade attached thereto, and FIG. 3B is a front view of the transmissive display apparatus with the light control shade removed therefrom.

FIGS. 16A and 16B are conceptual diagrams for describing an example of how to sense attachment and detachment of the light control shade.

DESCRIPTION OF EXEMPLARY EMBODIMENTS

First Embodiment

Figure 1:
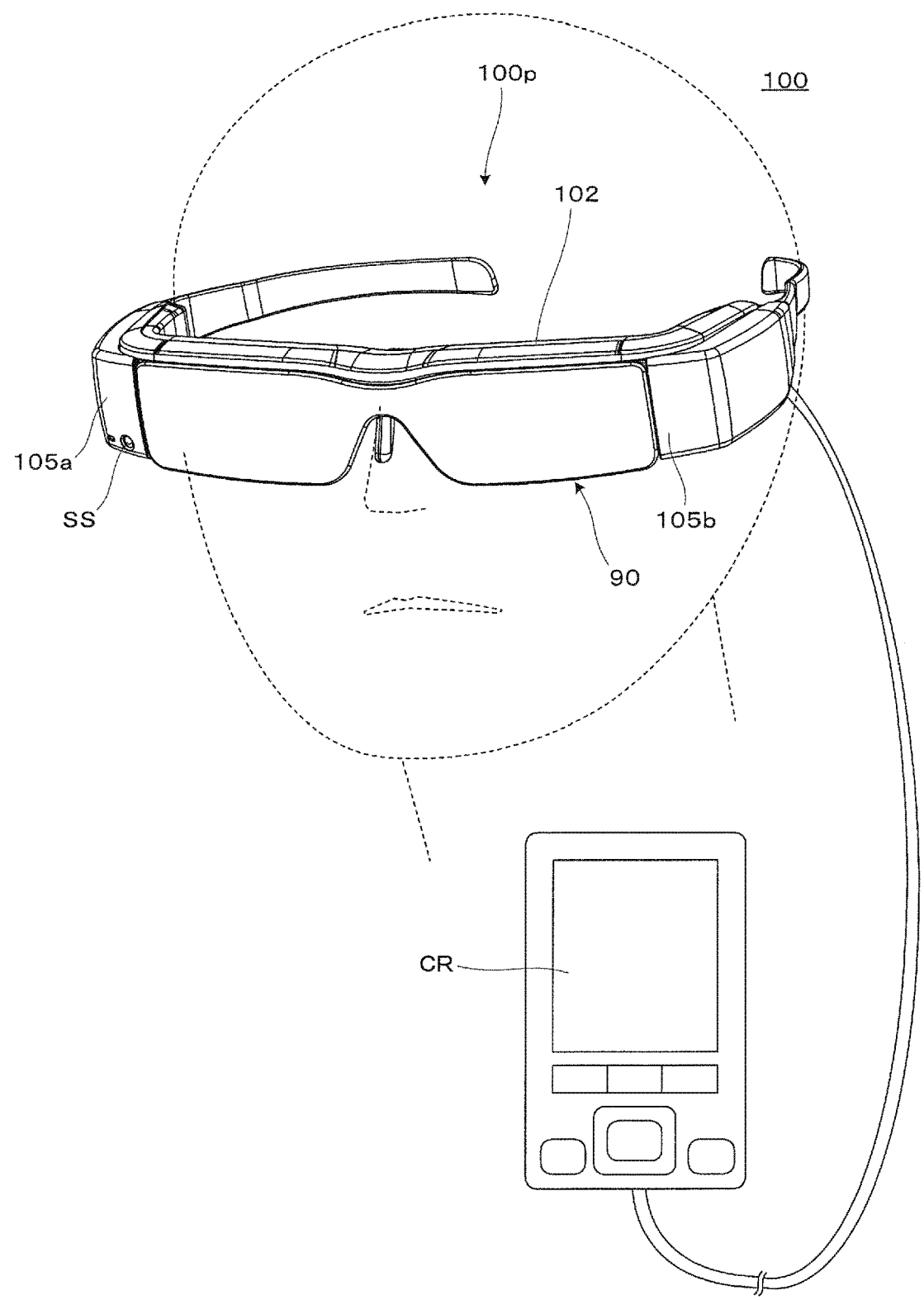
FIG. 1 is a perspective view for briefly describing the exterior appearance of a transmissive display apparatus according to a first embodiment.

A light guide apparatus and a transmissive display apparatus including the light guide apparatus according to an embodiment of the invention will be described below in detail with reference to FIG. 1 and other figures.

A transmissive display apparatus 100 including the light guide apparatus according to the present embodiment is not only a head mounted display having a glasses-like exterior appearance, as shown in FIGS. 1 to 3A and 3B, but also a virtual image display apparatus that allows a viewer or a user who wears the transmissive display apparatus 100 to visually recognize image light (video light) in the form of a virtual image, and the transmissive display apparatus 100 further allows the viewer to visually recognize or view a see-through outside image (allows outside light to pass the apparatus). In particular, a light control shade 90, which blocks or absorbs light, is attached to the transmissive display apparatus 100 according to the present embodiment. The light control shade 90 is an outside light transmittance adjuster that is so attached as to cover in-front-of-eye intended portions of the transmissive display apparatus 100 (portions corresponding to the side in front of intended positions where the viewer's eyes should be located) and adjusts outside light transmittance (adjusts the outside light quantity) to achieve satisfactory balance between outside light visibility and video light visibility. That is, the transmissive display apparatus 100 can change the outside light transmittance to adjust the field of view in the see-through observation of the outside. In the present embodiment, one of an outside light priority mode in which priority is given to visual recognition of outside light and a video light priority mode (image light priority mode) in which priority is given to visual recognition of video light can be chosen by way of example. As a more specific aspect of the outside light priority mode, it is conceivable, for example, to decrease the video light luminance over a display section, provide an area where no video image is displayed at the center of a display area, or perform any other type of action control so that priority is given to the visual recognition of outside light. As for the video light priority mode, it is conceivable, for example, to decrease the outside light transmittance of the entire display section with the aid of the light control shade 90 or any other component, increase the video light luminance over the display section, or perform any other type of action control so that priority is given to the visual recognition of video light.

The light control shade 90 can be implemented in a variety of aspects and is, for example, an electronic shade formed of an SPD (suspended particle device), an electrochromic device, or a guest-host liquid crystal or polymer dispersed liquid crystal device and so adjusted and controlled that the outside light transmittance is actively and quickly changed by using current- or voltage-based electrical drive. The light control shade 90 described above includes an attachment portion formed of a flexible member made, for example, of a resin material and is therefore attachable and detachable to and from the transmissive display apparatus 100, as shown in FIGS. 1 to 3A and 3B. The light control shade 90 may instead be undetachable but permanently fixed to the transmissive display apparatus 100, unlike the case described above, that is, may only take the aspects shown in FIG. 1 and FIG. 3A.

In addition to the above, the transmissive display apparatus 100 includes a controller (control apparatus) CR, which accepts a variety of action instructions from the viewer, as shown in FIG. 1 and other figures. The controller CR functions as an input apparatus that is, for example, wired to a main body portion 100p, which forms part of the transmissive display apparatus 100 and has an optical function for video image display, and has a button section, a touch panel section, or any other section to accept the viewer's operation instruction for display action and other types of action of the main body portion 100p. The viewer can choose, for example, the outside light priority mode or the video light priority mode described above as one of a variety of types of operation. For example, when the viewer is in motion on a bicycle, an automobile, or any other vehicle so that the viewer needs to keep watching the outside environment, the viewer can choose the outside light priority mode, otherwise the viewer can choose the video light priority mode so that the viewer can concentrate on video images. It is assumed that the transmissive display apparatus 100 has different initial settings of the transmittance of the light control shade 90, the luminance of video light, and other factors set differently in accordance with a chosen mode.

In the transmissive display apparatus 100, the main body portion 100p includes first and second optical members 101a, 101b, which cover regions in front of the eyes (regions intended to be in front of eyes, in-front-of-eye intended portions), the front regions corresponding to one of the viewer's visual recognition directions (Z direction, for example), in such a way that the viewer can view the outside through the optical members 101a, 101b, a frame section 102, which supports the optical members 101a and 101b, and first and second image formation main body sections 105a, 105b, which are added to portions extending from the right and left ends of the frame section 102 to rear bow portions (temples) 104. A first display apparatus 100A, which is the combination of the first optical member 101a and the first image formation main body section 105a on the left in the drawings, is a display section DSa, which forms a virtual image for the right eye, and functions as a transmissive display apparatus by itself. A second display apparatus 100B, which is the combination of the second optical member 101b and the second image formation main body section 105b on the right in the drawings, is a display section DSb, which forms a virtual image for the left eye, and functions as a transmissive display apparatus by itself.

In addition to the above, the transmissive display apparatus 100 according to the present embodiment includes an outside light sensor SS, which is an outside light detection section for measuring the state of outside light. A variety of sensors for measuring the brightness of the outside can be used as the outside light sensor SS, and the outside light sensor SS is formed, for example, of an ambient sensor (that is, ambient light sensor) that serves as an illuminance sensor for measuring the illuminance of the outside light (transmitted light illuminance sensor). The outside light sensor SS is disposed on one side of the main body portion 100p, is directed forward, that is, toward the side intended to be in front of the eyes, the front side corresponding to one of the viewer's visual recognition directions, and senses outside light over a range corresponding, for example, to the entire range of the viewer's visual field, as illustrated in FIG. 1 and other figures. In other words, the outside light sensor SS, the sensing range of which corresponds to the viewer's visual field, can sense the brightness around the viewer at least including components of the outside light that correspond to components that reach the viewer's eyes. Further, the outside light sensor SS may be capable of sensing outside light components traveling in the direction parallel to the direction considered to be the sight line direction (direction according to sight line direction) of the viewer who wears the transmissive display apparatus 100. The outside light sensor SS measures the situation of the outside, for example, every 0.1 msec and transmits a result of the measurement to the controller CR, which is the control apparatus.

Among the components of the transmissive display apparatus 100, an optical function of the main body portion 100p will be described below with reference to FIG. 4. The pair of right and left display sections DSa and DSb (display apparatus 100A and 100B) operate in the same manner in terms of the optical function, and only the first display apparatus 100A will therefore be illustrated and described but the second display apparatus 100B will not be illustrated or otherwise described.

Figure 4:
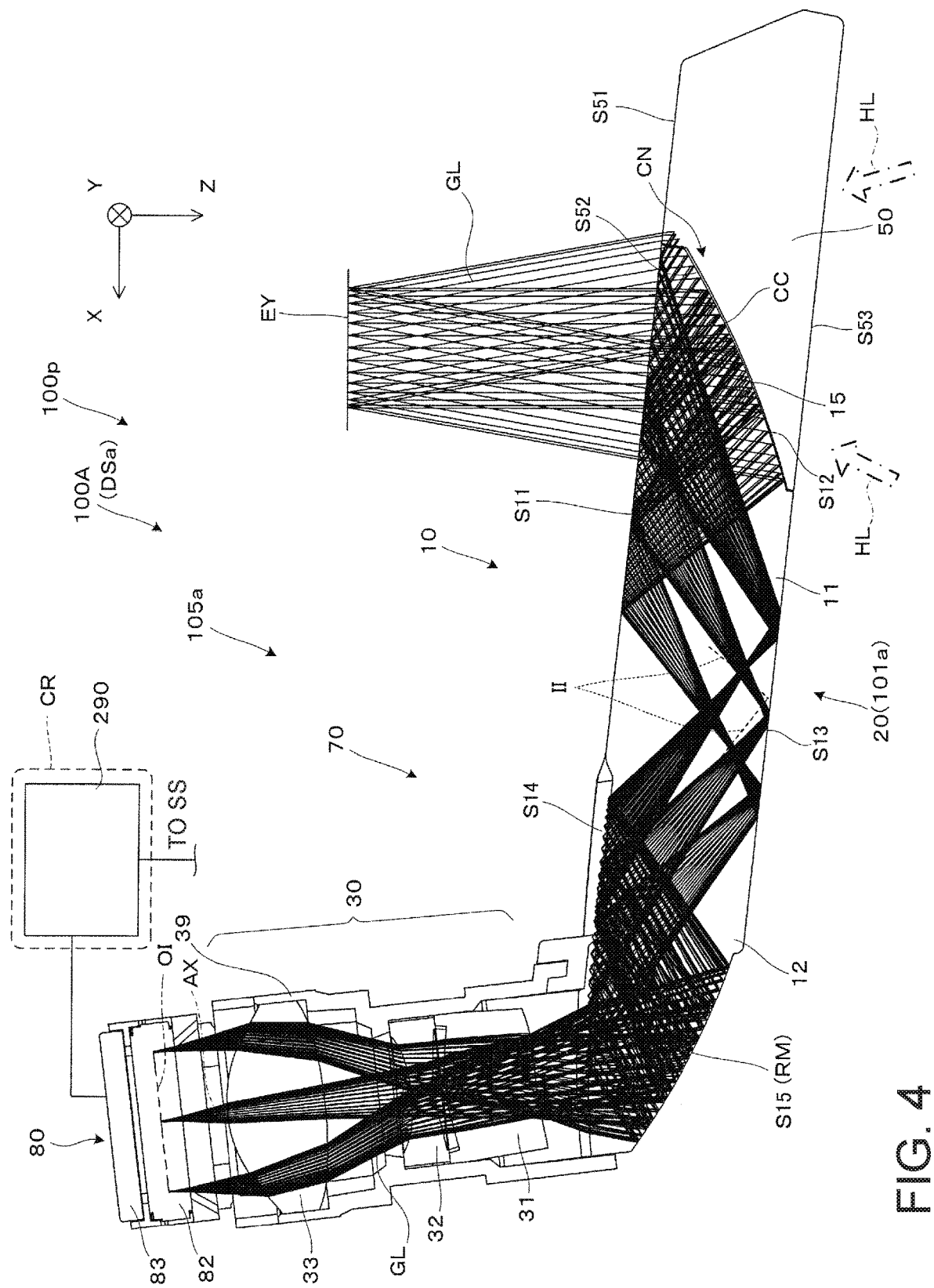
FIG. 4 shows the optical path of video light in the transmissive display apparatus.

The first display apparatus 100A can be considered to include a projection/see-through apparatus 70, which is an optical system for projection, and an image display apparatus 80, which forms video light, as shown in FIG. 4. The projection/see-through apparatus 70 plays a role of projecting an image formed by the image display apparatus 80 in the form of a virtual image onto the viewer's eye. The projection/see-through apparatus 70 includes a first optical member 101a or a light guide apparatus 20 and a projection lens 30 for image formation. The first optical member 101a or the light guide apparatus 20 is formed of a light guide member 10 for light guide operation and see-through operation and a light transmissive member 50 for the see-through operation. The first image formation main body section 105a is formed of the image display apparatus 80 and the projection lens 30.

The image display apparatus 80 includes a video display element (video element) 82, which is a transmissive spatial light modulator formed primarily of a liquid crystal panel or any other component, and further includes an illumination apparatus 83, which is a backlight that outputs illumination light toward the video display element 82. A variety of drivers are further provided as a drive control section that controls the action of the video display element 82 and other components.

The projection lens 30 is a projection system including, as constituent elements, for example, three optical elements (lenses) 31 to 33 along a light-incident-side optical axis (optical axis AX) and is supported by a lens barrel section 39, which accommodates the optical elements 31 to 33. The surfaces of the lenses 31 to 33 include an axially non-symmetric curved surface (free-form surface).

The light guide apparatus 20 is formed of the light guide member 10 for the light guide operation and see-through operation and the light transmissive member 50 for the see-through operation. A main body portion of each of the light guide member 10 and the light transmissive member 50 is made, for example, of a resin material showing high light transparency in the visible range, such as a cycloolefin polymer. The light guide member 10 is part of the prism-shaped light guide apparatus 20 as described above and integrated therewith, but can be considered as the combination of a first light guide portion 11 on the light exiting side and a second light guide portion 12 on the light incident side. The light transmissive member 50 is a member that assists the light guide member 10 in performing the see-through function (assistant optical block) and is integrated with and fixed to the light guide member 10 into the single light guide apparatus 20. The thus configured light guide apparatus 20 has a front end section located on the side facing a light source (base side) and fit into an end portion of the lens barrel section 39, whereby the light guide apparatus 20 is positioned with respect to the projection lens 30 and fixed thereto with precision.

The structure and other factors of the light guide apparatus 20 will be described below in detail from an optical functional point of view. The light guide apparatus 20 is formed of the light guide member 10 and the light transmissive member 50, as described above. Out of the two members, the light guide member 10 has a central portion that is close to the nose and linearly extends in a plan view. In the light guide member 10, the first light guide portion 11, which is disposed on the central side close to the nose, that is, on the light exiting side, has a first surface S11, a second surface S12, and a third surface S13 as side surfaces having optical functions, and the second light guide portion 12, which is disposed on the peripheral side away from the nose, that is, on the light incident side, has a fourth surface S14 and a fifth surface S15 as side surfaces having optical functions. Among the surfaces, the first surface S11 and the fourth surface S14 are continuously adjacent to each other, and the third surface S13 and the fifth surface S15 are continuously adjacent to each other. The second surface S12 is disposed between the first surface S11 and the third surface S13, and the fourth surface S14 and the fifth surface S15 are adjacent to each other with a large angle therebetween. Further, in the description, the first surface S11 and the third surface S13, which face each other, have planar shapes roughly parallel to each other. On the other hand, the other surfaces having optical functions, that is, the second surface S12, the fourth surface S14, and the fifth surface S15 are each an axially non-symmetric curved surface (free-form surface).

Among the surfaces described above that form the light guide apparatus 20, the second surface S12 is accompanied by a half-silvered mirror layer 15. The reflectance of the half-silvered mirror layer 15 is adjusted from a viewpoint of facilitating see-through observation of outside light. The fifth surface S15 is formed by deposition of a light reflection film RM made, for example, of an inorganic material and functions as a mirror reflection surface.

Further, in the light guide apparatus 20, the light guide member 10 is attached to the light transmissive member 50 via an adhesive layer CC and therefore bonded thereto, and the bonding surface of the light guide member 10, the bonding surface of the light transmissive member 50, and the adhesive layer CC form a bonding section CN. That is, the half-silvered mirror layer 15, which accompanies the second surface S12, is formed in the bonding section CN.

The light transmissive member 50 has a first transmissive surface S51, a second transmissive surface S52, and a third transmissive surface S53 as side surfaces having optical functions. The first transmissive surface S51 is a surface extended from the first surface S11 of the light guide member 10. The second transmissive surface S52 is a curved surface bonded to and integrated with the second surface S12 of the light guide member 10 via the adhesive layer CC. The third transmissive surface S53 is a surface extended from the third surface S13 of the light guide member 10.

Among the surfaces described above, since the second transmissive surface S52 and the second surface S12 of the light guide member 10 are bonded to and integrated with each other via the thin adhesive layer CC, the two surfaces have shapes having roughly the same curvature.

An example of the optical paths of the video light and other light fluxes will be described below. Video light GL outputted from the image display apparatus 80 passes through the projection lens 30, through which the video light GL gradually converges, and is incident on the fourth surface S14 of the light guide member 10 of the light guide apparatus 20. The video light GL having passed through the fourth surface S14 travels while converging, is reflected off the fifth surface S15, is incident on the inner side of the fourth surface S14 again, and reflected off the fourth surface S14. The video light GL reflected off the fourth surface S14 is incident on and totally reflected off the third surface S13 and is incident on and totally reflected off the first surface S11. In this process, the video light GL forms intermediate images in the light guide member 10 before and after the video light GL travels via the third surface S13. Image planes II of the intermediate image correspond to image planes of the video display element 82. The video light GL totally reflected off the first surface S11 is incident on the second surface S12. In particular, the video light GL incident on the half-silvered mirror layer 15 provided on the second surface S12 is partially reflected off the half-silvered mirror layer 15, with part of the video light GL passing therethrough, and is incident on the first surface S11 again and passes therethrough. The video light GL having passed through the first surface S11 is incident in the form of a roughly parallelized light flux on the pupil of the viewer's eye or the position equivalent thereto.

On the other hand, the outside light is hardly affected, for example, by aberrations and allows the viewer to view a distortion-free outside image not only because the third surface S13 and the first surface S11 are flat surfaces roughly parallel to each other but also because the third transmissive surface S53, which is an extension of the third surface S13, and the first transmissive surface S51, which is an extension of the first surface S11, are present. The light guide apparatus 20 thus forms a see-through-type optical system that superimposes the video light and the outside light on each other.

As described above, in the present embodiment, the video light from the video display element 82 is guided through the light guide member 10 while reflected five times off the first surface S11 to the fifth surface S15 including total reflection at least twice. The light guide operation described above not only allows the video light GL to be displayed and outside light HL to be visually recognized in see-through observation at the same time but also allows the aberrated video light GL to be corrected.

It is noted that the image display apparatus 80 can be implemented in a variety of other aspects. For example, the image display apparatus 80 can be formed of a typical LED or any of a variety of lamps as the light source and a liquid crystal panel or any other component.

A variety of types of control of the action of the image display apparatus 80 described above and other components are performed by a primary control section 290 provided in the controller CR. The primary control section 290 is connected to the outside light sensor SS and other components and acquires a variety of pieces of information necessary for the control of the video light. In particular, in the present embodiment, the primary control section 290 controls the transmittance of the light control shade 90 on the basis of information on a change in outside light acquired with the outside light sensor SS. The transmissive display apparatus 100 according to the present embodiment can thus appropriately control the quantity of outside light (components of outside light that reach viewer's eyes) in accordance with a change in the outside.

A variety of types of control performed by the transmissive display apparatus 100, including the control of the outside light quantity, will be described below in detail with reference to FIG. 5.

Figure 5:
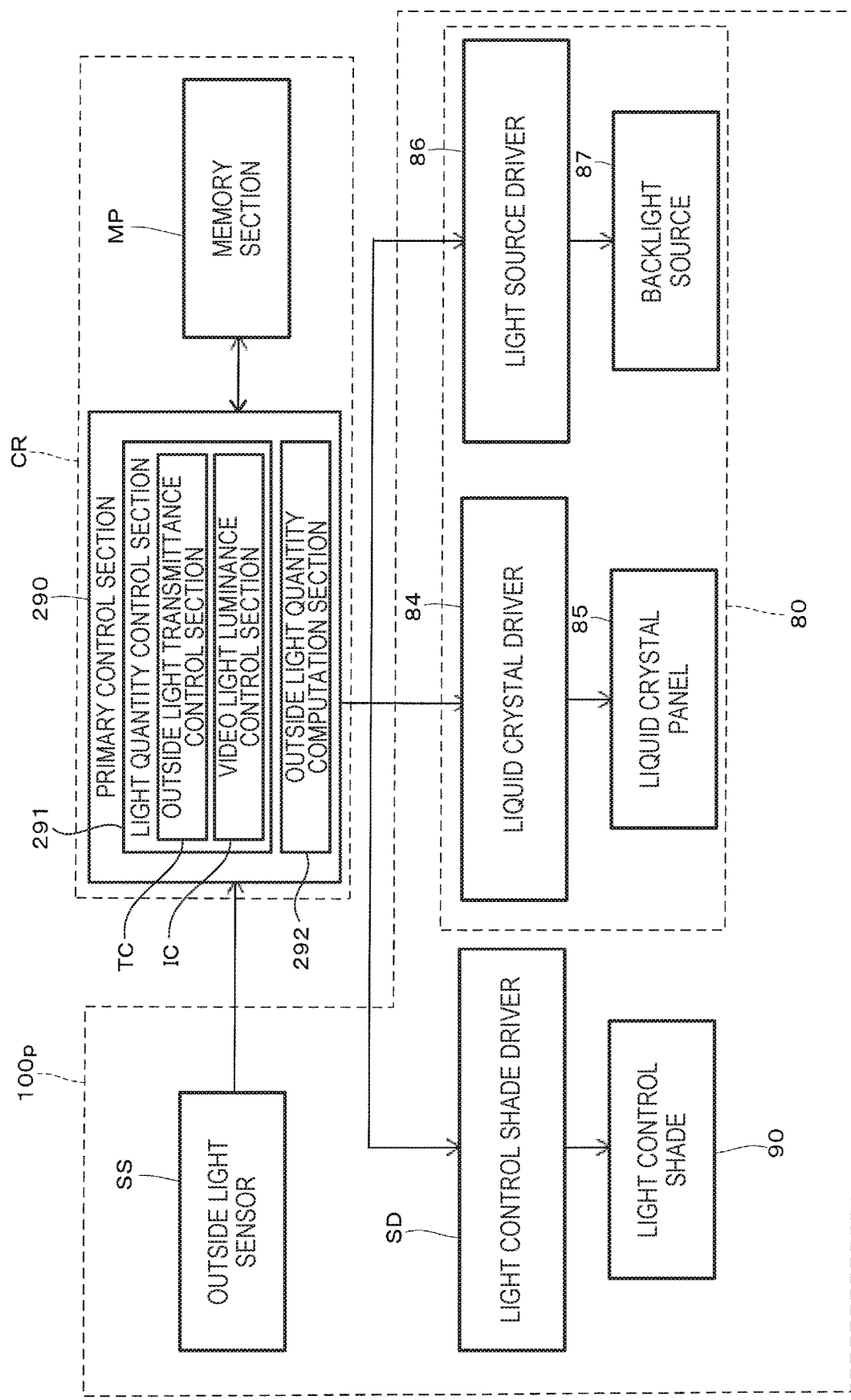
FIG. 5 is a block diagram for describing an example of control performed by the transmissive display apparatus.

FIG. 5 is a block diagram for conceptually describing each section that forms the transmissive display apparatus 100 and relates to the control of the video light. The transmissive display apparatus 100 includes, in the controller CR including the primary control section 290, which is responsible for the variety types of control operation, a memory section MP and an input apparatus (not shown) that is formed of a button section and a touch panel section that allows the viewer to perform a variety of types of operation and accepts the viewer's operation instruction, as well as the primary control section 290, as shown in FIG. 5.

The image display apparatus 80 is formed of the video display element 82 and the illumination apparatus 83, as described above. In the description, the pair of right and left image display apparatus 80 are collectively described. The video display elements 82 include right and left liquid crystal drivers 84 and liquid crystal panels 85. The illumination apparatus 83 include right and left light source drivers 86 and backlight sources 87. Each of the image display apparatus 80 displays the video light in accordance with a signal from the primary control section 290. The primary control section 290 controls the action of each of the drivers by transmitting an instruction signal to the driver.

The outside light sensor SS is formed, for example, of an ambient sensor that measures the illuminance of the outside light and senses light components of the outside light that correspond to the components that reach the viewer's eyes, as described above, and transmits a result of the sensing to the primary control section 290 of the controller CR (every 0.1 msec, for example).

The memory section MP stores a variety of programs necessary for the video image control under the control of the primary control section 290 and a variety of data, such as image data (for example, a variety of data, such as threshold Lc, which will be described later, and a variety of programs for control corresponding, for example, to filter A).

The primary control section 290, which is a primary control section responsible for control action of the controller CR, as described above, controls the action of each section that forms the controller CR and performs a variety of types of control by transmitting and receiving signals to and from the light control shade 90, the image display apparatus 80, and other components, which are attached to the main body portion 100p and connected to the primary control section 290, to oversee the entire video light control. In particular, in the present embodiment, the primary control section 290 includes a light quantity control section 291 and an outside light quantity computation section 292 for performing light quantity control action according to a change in the outside light. The light quantity control section 291 includes an outside light transmittance control section TC, which controls adjustment of the transmittance of the light control shade 90, and a video light luminance control section IC, which controls adjustment of the luminance of the video light. The light quantity control section 291 causes the outside light quantity computation section 292 to compute the outside light quantity on the basis of acquired information and performs necessary light quantity control on the basis of a result of the computation. A description will first be made of an example in which the outside light transmittance control section TC, which forms the light quantity control section 291, adjusts the transmittance of the light control shade 90 to allow the light quantity control section 291 and hence the primary control section 290 to perform quicker, more accurate control corresponding to a change in the outside light quantity. An example of the control performed by the video light luminance control section IC will be described later separately (see FIGS. 10A and 10B and other figures).

Figure 6:
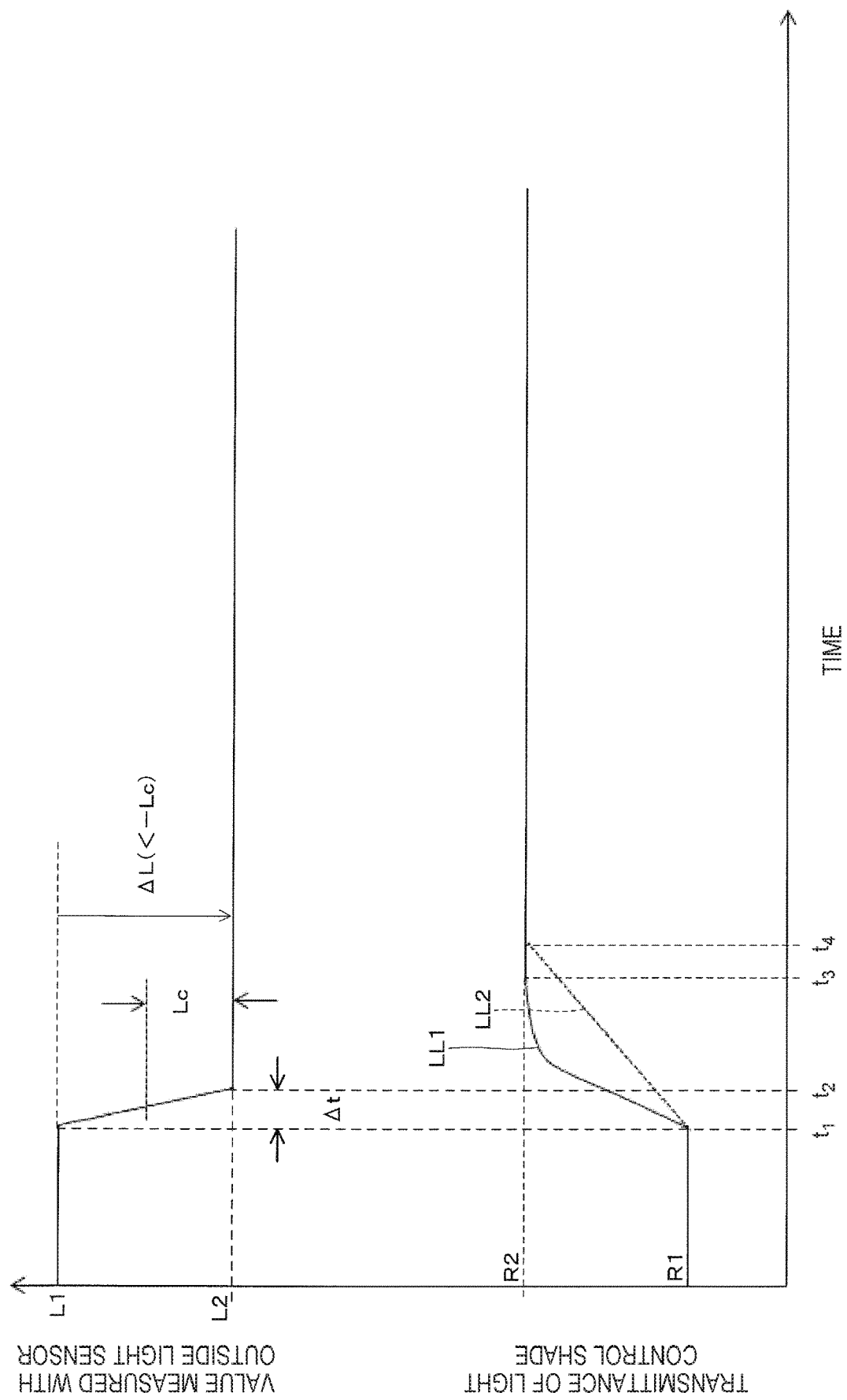
FIG. 6 shows graphs for describing adjustment of the transmittance of the light control shade with respect to a value measured with an outside light sensor in a case where the outside light quantity decreases.
Figure 7:
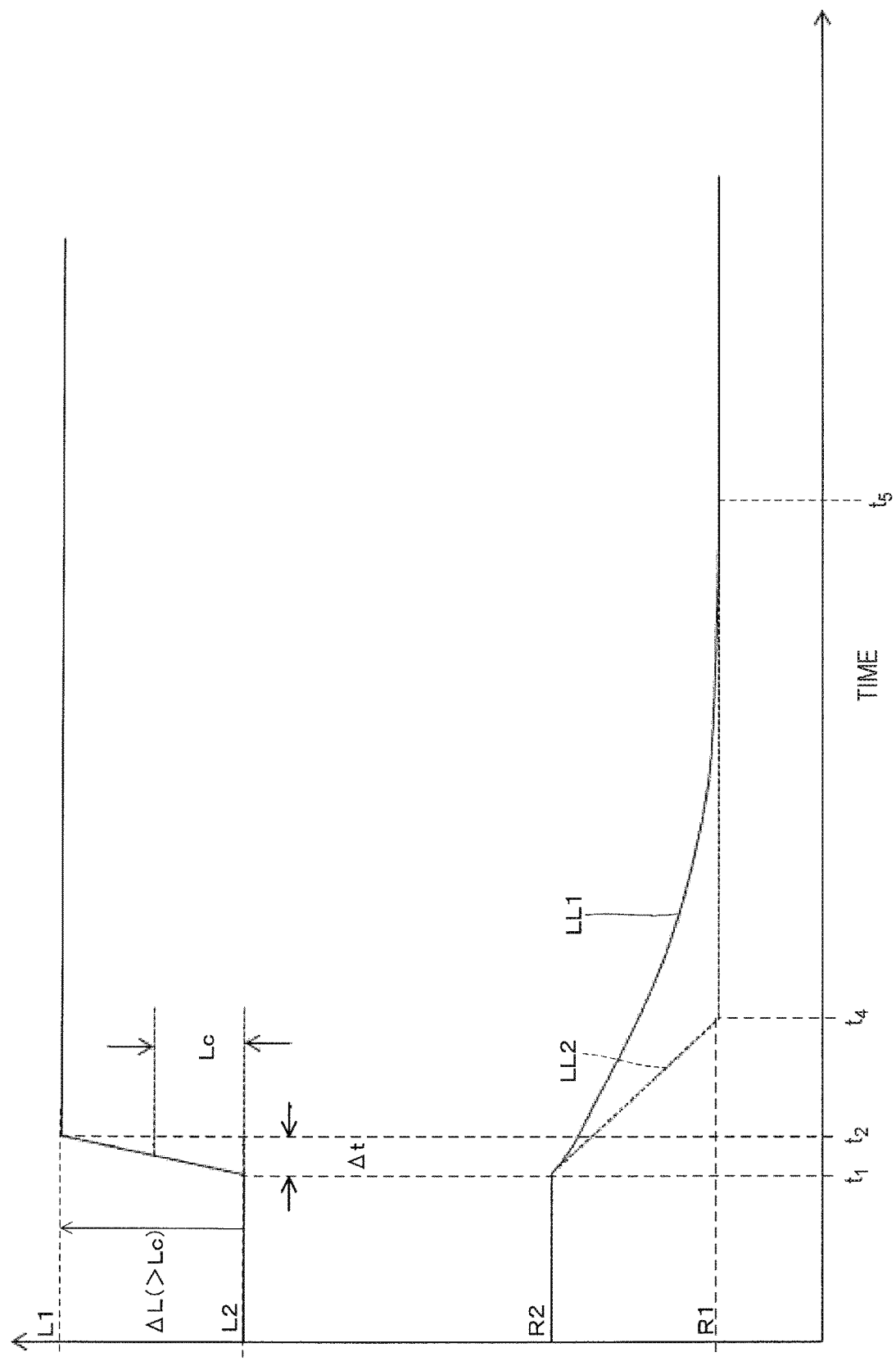
FIG. 7 shows graphs for describing the adjustment of the transmittance of the light control shade with respect to a value measured with the outside light sensor in a case where the outside light quantity increases.

An example in which the transmissive display apparatus 100 controls the adjustment of the transmittance of the light control shade 90 in accordance with a change in outside light will be described with reference to FIG. 6 and other figures. FIGS. 6 and 7 show graphs for describing how the transmittance of the light control shade 90 is adjusted with respect to a value measured with the outside light sensor when the outside light quantity changes. FIG. 6 shows an example in which the outside light quantity decreases, and FIG. 7 shows an example in which the outside light quantity increases. More specifically, first in FIG. 6, the upper portion shows values measured with the outside light sensor SS. The horizontal axis (t) represents time (unit: seconds, for example). The vertical axis (L=L(t)) represents the brightness, such as the magnitude of the outside illuminance measured with the outside light sensor SS (unit: lux, for example). The measured outside light quantity decreases from a value L1 to a value L2 (<L1) in Δt seconds from time $t_1$ to $t_2$, as shown in upper portion of FIG. 6. The measured outside light quantity is defined as ΔL=L2−L1. That is, the value ΔL represents the amount of change in the outside light (magnitude of change in outside light quantity) in Δt seconds. On the other hand, in FIG. 6, the lower portion shows a change in the transmittance of the light control shade 90 in response to a decrease in the outside light quantity. The horizontal axis (t) represents time (unit: seconds, for example), as in the upper portion. The vertical axis (R=R(t)) represents the magnitude of the transmittance (%). In FIG. 6, a line LL1 drawn with the solid line is a curve representing the change in the transmittance. That is, in this case, the transmittance of the light control shade 90 increases from R1 to R2 in the period from time $t_1$ to $t_3$, as shown in the lower portion of FIG. 6. The period from the time $t_1$ to $t_3$ is called a rising period for which the transmittance of the light control shade 90 is increased. That is, the rising period used herein means a period from the time when the transmittance of the light control shade 90 is caused to start increasing to the time when the increase is completed. Further, a line LL2 drawn with the broken line in FIG. 6 is presented for comparison purposes and shows the change in the transmittance in a case where the transmittance is controlled on the basis of moving average of changes in the outside light quantity. The line LL2 indicates that the period from the time $t_1$ to $t_4$ ($>t_3$) is required to increase the transmittance of the light control shade 90 from R1 to R2 (>R1), as shown in the lower portion of FIG. 6. That is, the rising period for which the transmittance is increased is longer (response speed is slower) than the rising period in the present embodiment.

In general, to determine the transmittance of the light control shade, a function or a table uniquely determined by using values measured with a light quantity sensor is typically used. However, for example, in a situation in which a large number of fluorescent lamps are present in the user's field of view or in an outdoor situation in which a large number of objects that greatly differ from one another in terms of brightness, such as the sky, a mountain, and the ground, are present, the light control shade frequently changes the transmittance in accordance with the direction of the user's field of view, and the frequent change annoys the user. To avoid the situation, it is conceivable to employ a method for accumulating values measured with the light quantity sensor for the past sub-milliseconds to several seconds in a memory, deriving moving average of changes in the light quantity, and using the moving average to determine the transmittance of the light control shade. The line LL2 shows an example of the control of the transmittance determined on the basis of the method. In the following description, the control based on the moving average is called typical light quantity control. The comparison between the line LL1 and the line LL2 shows that the adjustment of the transmittance of the light control shade 90 in the present embodiment is so controlled that the response speed faster than the response speed in the typical light quantity control is achieved. In the following description, the light quantity control in which relatively faster response speed is achieved is called quick response control.

The light quantity control in the case where the outside light quantity increases will next be described with reference to FIG. 7. First, in FIG. 7, the upper portion shows values measured with the outside light sensor SS, and the lower portion shows a change in the transmittance of the light control shade 90 in response to an increase in the outside light quantity, as in FIG. 6. The vertical and horizontal axes also represent the same parameters as those in FIG. 6. To simplify the description, it is assumed that the measured outside light quantity increases from the value L2 to the value L1 (>L2, $\Delta L=L1-L2$) in the $\Delta t$ seconds from the time $t_1$ to $t_2$ in the upper portion of FIG. 7. In the lower portion of FIG. 7, a line LL1 drawn with the solid line is a curve representing a change in the transmittance, and it is assumed that the transmittance decreases from R2 (>R1) to R1. It is further assumed in FIG. 7 that a line LL2 is presented for comparison purposes and represents the typical light quantity control, which is the control based on moving average of changes in the outside light quantity. That is, the line LL2 is assumed to show that the period from the time $t_1$ to $t_4$ is required to lower the transmittance from R2 to R1. On the other hand, as indicated by the line LL1, in the case where the outside light quantity increases, the period from the time $t_1$ to $t_5$ (>$t_4$) is required to lower the transmittance from R2 to R1. That is, the control in the present embodiment is so performed that response speed slower than the response speed in the typical light quantity control is achieved. The period from the time $t_1$ to $t_5$ is called a falling period for which the transmittance of the light control shade 90 is decreased. That is, the falling period used herein means the period from the time when the transmittance of the light control shade 90 is caused to start decreasing to the time when the decrease is completed. Further, in the following description, the light quantity control in which relatively slow response speed is achieved is called delay control.

In the control illustrated in FIGS. 6 and 7, it can also be said that the light quantity control section 291 (or outside light transmittance control section TC) of the primary control section 290 performs the quick response control by making the rising period for which the transmittance of the light control shade 90 is increased in the case where a decrease in the outside light quantity is detected shorter than the falling period for which the transmittance of the light control shade is decreased in the case where an increase in the outside light quantity is detected.

Figure 8:
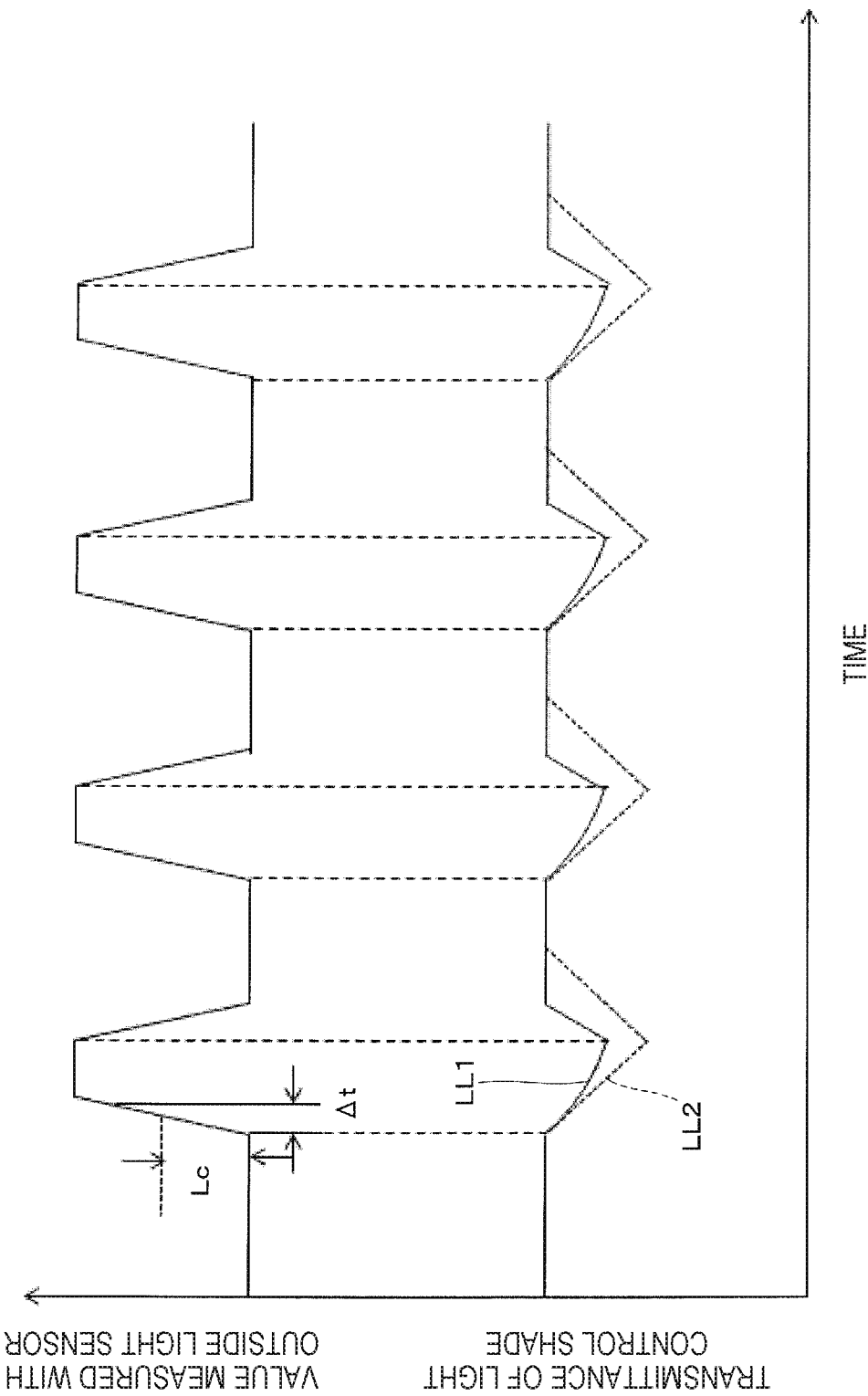
FIG. 8 shows graphs illustrating a change in the transmittance of the light control shade in response to a change in a value measured with the outside light sensor.

As a result of the control described above, comparison of a period t required for the change in the transmittance in the case where a decrease in the outside light quantity is detected (FIG. 6) with the period t in the case where an increase in the outside light quantity is detected (FIG. 7) shows that the quick response control is so performed that the response speed of the light quantity control in the case where a decrease in the outside light quantity is detected is made faster than the response speed of the light quantity control in the case where an increase in the outside light quantity is detected. Performing the quick response control and the delay control combined with each other as described above relatively gently suppresses the change in the transmittance of the light control shade 90 (narrows the width of the change), as shown, for example, in FIG. 8, even when the light quantity in the field of view frequently changes, as compared with the case where the typical light quantity control based on moving average indicated by the broken line is performed, whereby the situation in which the viewer is annoyed by a frequent change in the transmittance of the light control shade can be avoided.

In summary, first of all, the light quantity control described above functions in the control modes different from the normal control mode when the light quantity measured with the outside light sensor SS sharply decreases and increases.

In particular, when the light quantity measured with the outside light sensor SS sharply decreases, that is, when the field of view abruptly becomes dark, the video light quantity is greater than the outside light quantity and it is therefore highly probable that the field of view is blocked by the video light and the viewer cannot grasp the situation in the field of view. In this case, a weighted filter A is used in place of a typical unweighted moving average filter (filter B) to improve the responsiveness of the light quantity control so that the transmittance of the light control shade is so changed as to increase instantaneously (FIG. 6).

On the other hand, when the light quantity measured with the outside light sensor SS sharply increases, that is, when the field of view abruptly becomes bright, the field of view is more definitely visible than the video light, and it is therefore believed that no safety problem is unlikely to occur as long as the apparatus is used as intended by the specifications. Therefore, a filter C that is comparable to the typical moving average filter (filter B) or a less weighted filter that is less responsive than the typical moving average filter is used to gradually change the transmittance of the light control shade in such a way that transmittance suitable for the brightness of the outside light is achieved (FIG. 7).

When the light control shade 90 is interpreted from the viewpoint of the control described above, the light control shade 90 is a light control shade for a transmissive display apparatus, that is, the light control shade 90 is removably provided on the transmissive display apparatus 100 (main body portion 100*p*) with the light control shade 90 removed therefrom in such a way that the light control shade 90 faces the display sections DSa and DSb and controls the outside light incident on the transmissive display apparatus 100. Further, the light control shade 90 controls the outside light in such a way that the speed at which the outside light transmittance is increased is faster than the speed at which the outside light transmittance is decreased.

Referring back to FIG. 5, a variety of control programs necessary for the control described above are stored in the memory section MP. That is, the light quantity control section 291 (outside light transmittance control section TC), which forms the primary control section 290, reads the variety of control programs for the action described above from the memory section MP as required and performs action control corresponding to what has been described above. More specifically, to perform the action described above, it is assumed in the description that in addition to a control program for performing the quick response control shown in FIG. 6 and a control program for performing the delay control shown in FIG. 7, at least a control program for performing the typical light quantity control is provided in preparation for a case where no abrupt change occurs. Further, in the description, a module of a variety of programs for performing the quick response control is called the filter A, a module of a variety of programs for performing the typical light quantity control is called the filter B, and a module of a variety of programs for performing the delay control is called the filter C. That is, the filters A to C are stored in the memory section MP.

Figure 9:
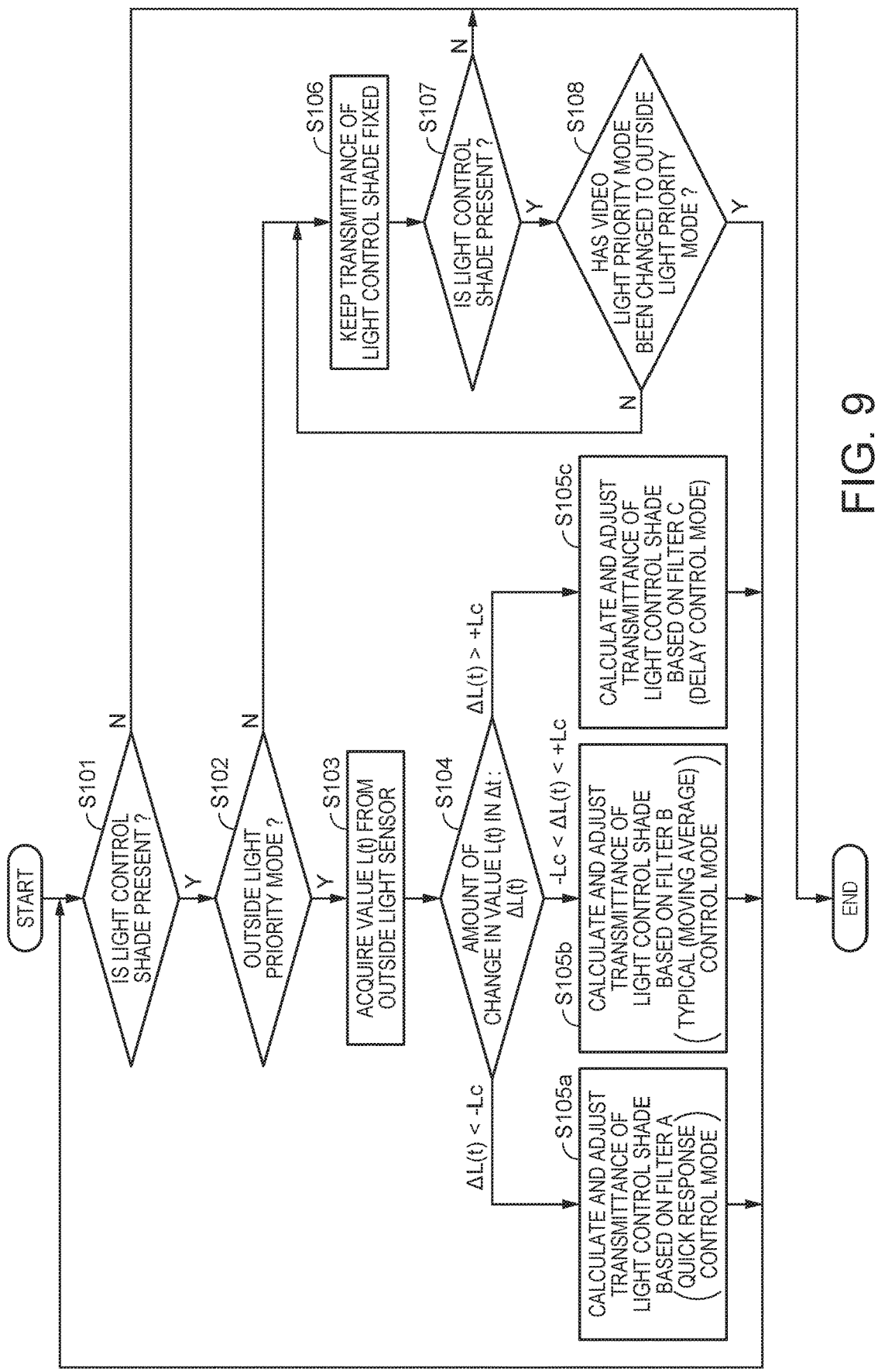
FIG. 9 is a flowchart for describing an example of control of the transmittance of the light control shade.

Among the variety of types of control performed by the transmissive display apparatus 100, an example of the control of the transmittance of the light control shade 90 (outside light control) will be described below with reference to the flowchart of FIG. 9.

When the transmissive display apparatus 100 starts operating, the primary control section 290 first checks whether the light control shade 90 has been attached to or detached from the transmissive display apparatus 100 (step S101). When the primary control section 290 determines in step S101 that the light control shade 90 has been attached to the transmissive display apparatus 100 (Yes in step S101), the primary control section 290 checks whether the current action environment is set at the outside light priority mode or not (whether the current action environment is set at video light priority mode) (step S102). When the primary control section 290 determines in step S102 that the outside light priority mode has been set (Yes in step S102), the primary control section 290 reads the value L(t) measured with the outside light sensor SS (step S103) and calculates ΔL(t)=L(t)−L(t−Δt), which is the amount of change in the value L(t) in Δt seconds (step S104). Further, in step S104, the primary control section 290 reads a threshold Lc (>0), which is a value determined in advance, compares the calculated value ΔL(t) with the threshold Lc. When the value ΔL(t) is smaller than the threshold Lc multiplied by −1, the primary control section 290 calculates a value for setting the transmittance of the light control shade 90 based on the filter A and adjusts the transmittance of the light control shade 90 accordingly (step S105a). That is, the primary control section 290 determines on the basis of the value measured with the outside light sensor SS that the outside light quantity has sharply decreased and performs the quick response control. When the value ΔL(t) is greater than the threshold Lc multiplied by −1 but smaller than the threshold Lc (when absolute value of ΔL(t) is smaller than threshold Lc), the primary control section 290 calculates a value for setting the transmittance of the light control shade 90 based on the filter B and adjusts the transmittance of the light control shade 90 accordingly (step S105b). That is, the primary control section 290 determines on the basis of the value measured with the outside light sensor SS that the outside light quantity has not sharply changed and performs the typical light quantity control. When the value ΔL(t) is greater than the threshold Lc, the primary control section 290 calculates a value for setting the transmittance of the light control shade 90 based on the filter C and adjusts the transmittance of the light control shade 90 accordingly (step S105c). That is, the primary control section 290 determines on the basis of the value measured with the outside light sensor SS that the outside light quantity has sharply increased and performs the delay control.

Having performed the calculation and control in any of steps S105a to S105c, the transmissive display apparatus 100 adjusts the transmittance of the light control shade 90 (outside light quantity control) on the basis of the calculation and repeats the action in step S101 and the following steps.

Among the steps described above, when the primary control section 290 determines in step S102 that the outside light priority mode has not been set (video light priority mode has been set) (No in step S102), the primary control section 290 acquires no information from the outside light sensor SS but sets the transmittance of the light control shade 90 at a fixed value (step S106), and checks whether or not the light control shade 90 is present (step S107) and whether or not the priority mode has been changed (step S108). As long as the primary control section 290 determines that the light control shade 90 is present (Yes in step S107) and the video light priority mode remains set (No in step S108), the primary control section 290 maintains the transmittance of the light control shade 90 at step S105 at the fixed value. On the other hand, the primary control section 290 determines in step S108 that the priority mode has been changed (switched to outside light priority mode) (Yes in step S108), the primary control section 290 returns to step S101 and resumes the action described above. The primary control section 290 repeats the action described above until the primary control section 290 determines in step S101 or S107 that the light control shade 90 has been removed from the transmissive display apparatus 100 (No in step S101 or No in step S107).

In summary of the action control described above, the primary control section 290 performs the quick response control when the condition that a decrease in the outside light quantity in a predetermined period (Δt seconds) exceeds a predetermined amount (the outside light quantity decreases by a value greater than the width of the threshold Lc) is satisfied, performs the delay control when the condition that an increase in the outside light quantity in the predetermined period (Δt seconds) exceeds a predetermined amount (threshold Lc) is satisfied, and controls the transmittance of the light control shade 90 on the basis of typical moving average (performs typical light quantity control) when neither of the conditions described above is satisfied.

Further, in the above description, the light quantity control can be switched in accordance with the priority mode, the outside light priority mode or the video light priority mode. In particular, the quick response control is performed when the transmissive display apparatus 100 operates in the outside light priority mode. It is noted that the switching of the priority mode between the outside light priority mode and the video light priority mode can be performed in a variety of aspects. For example, a selection button that accepts a switching-related instruction may be provided in the controller CR, specifically, in an operation section that is not shown, as described above. Instead, for example, when the quantity of the outside light (outside light quantity) and the quantity of the video light (video light quantity) satisfy the relationship of the outside light quantity>the video light quantity, the outside light priority mode may be set, whereas when the outside light quantity<the video light quantity, the video light priority mode may be set.

The primary control section 290, which adjusts the transmittance of the light control shade 90 as described above, is also responsible for controlled action of the entire apparatus and therefore oversees the entire video light control, which is primary action control. Therefore, the outside light quantity control using the adjustment of the transmittance of the light control shade 90 described above is also applicable to the adjustment of the luminance of the video light from the image display apparatus 80, that is, the video light quantity control. In the description, the light quantity control section 291 of the primary control section 290 includes the video light luminance control section IC as a section that performs control of adjustment of the luminance of the video light.

The luminance adjustment (video light quantity control) in response to a change in the outside light quantity (change in value measured with outside light sensor SS) in the video light control performed by the primary control section 290 will be described below with reference to FIGS. 10A and 10B and other figures.

Figures 10A, 10B:
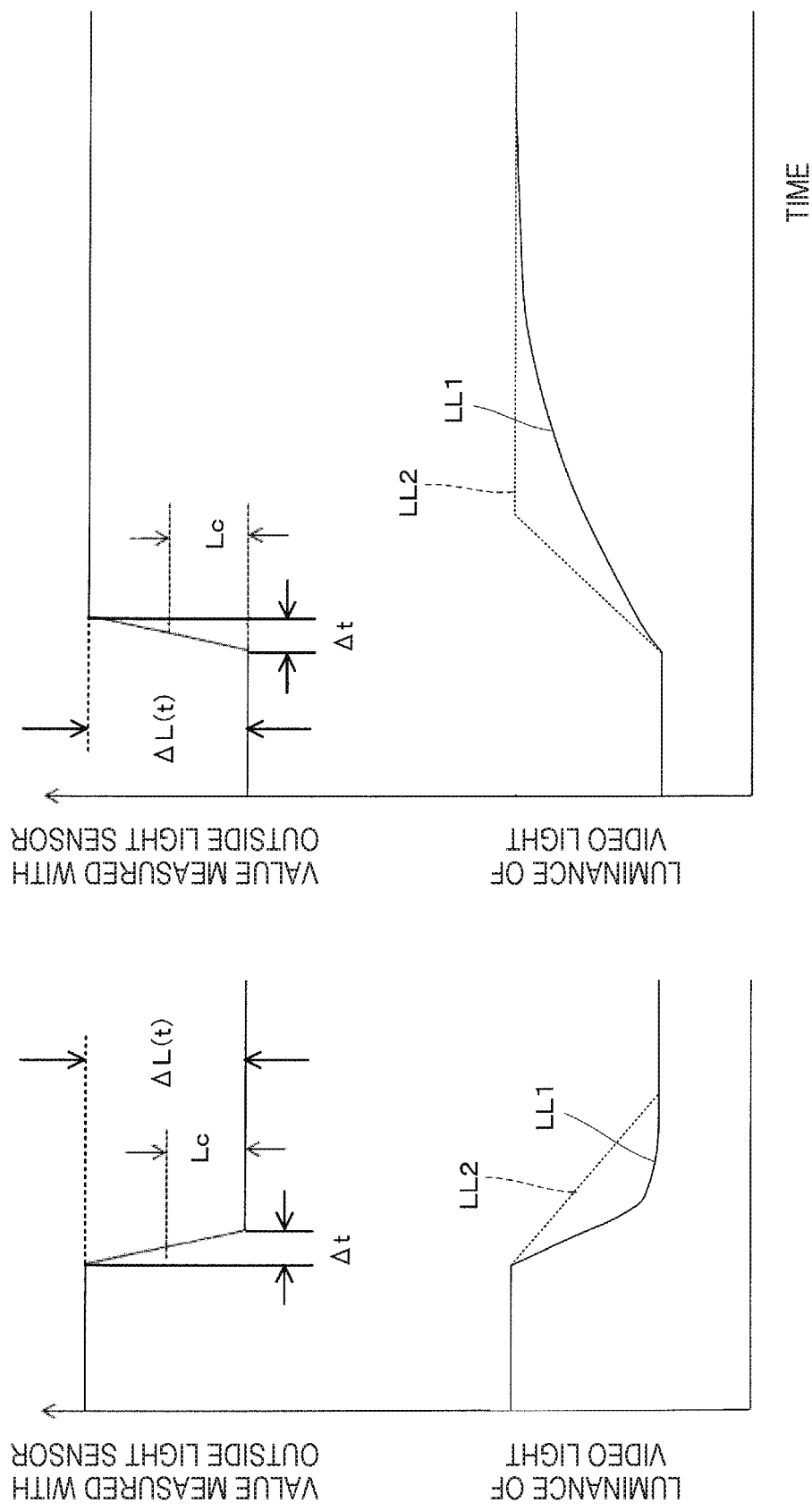
FIG. 10A show graphs for describing adjustment of the luminance of the video light with respect to a value measured with the outside light sensor in the case where the outside light quantity decreases, and FIG. 10B show graphs for describing adjustment of the luminance of the video light with respect to a value measured with the outside light sensor in the case where the outside light quantity increases.

FIGS. 10A and 10B correspond to FIGS. 6 and 7, respectively, and the upper portions of FIGS. 10A and 10B are the same as those in FIGS. 6 and 7 and will not therefore be described. The lower portions of FIGS. 10A and 10B show changes in the luminance of the video light produced by the image display apparatus 80, instead of changes in the transmittance of the light control shade 90 in FIG. 6 and other figures. It is assumed in the description that the vertical axis in the lower portions represents the ratio (%) of the luminance of the video light to the luminance of the video light at a normal setting, which is assumed to be 100%, by way of example. As shown in FIGS. 10A and 10B, in the video light quantity control, the primary control section 290 performs the quick response control, in which the response speed of the light quantity control in the case where a decrease in the outside light quantity is detected with the outside light sensor SS is made faster than the response speed in the case where an increase in the outside light quantity is detected. More specifically, when a decrease in the outside light quantity is detected, the primary control section 290 decreases, as the quick response control, the luminance of the video light produced by the image display apparatus 80, that is, performs the quick response control in such a way that the period for which the luminance at the display sections DSa and DSb (see FIG. 2) is decreased is made shorter than the period for which the luminance at the display sections DSa and DSb is increased in the case where an increase in the outside light quantity is detected. That is, when a decrease in the outside light quantity is detected, the luminance of the video light to be visually recognized is quickly decreased so that video images to be visually recognized are dimmed, whereby a situation in which the video light becomes dominant in response to a decrease in the outside light quantity is avoided, so that the outside can be visually recognized in a safer manner.

As described above, the transmissive display apparatus 100 according to the present embodiment allows see-through observation in which video light and outside light are superimposed on each other for visual recognition of the superimposed light and further allows the light control shade 90 to control the outside light by changing the outside light transmittance of the light control shade 90 in accordance with a change in the outside light quantity. In this case, in particular, when a decrease in the outside light quantity is detected with the outside light sensor SS, which is the outside light detection section, the light quantity control section 291 of the primary control section 290 performs the quick response control, in which the transmittance of the light control shade 90 is quickly adjusted (outside light quantity is controlled). As a result, appropriate outside light quantity can be ensured, whereby the outside can be visually recognized in a safer manner.

In the above description, the light quantity control section 291 includes the outside light transmittance control section TC, which makes transmittance adjustment, and the video light luminance control section IC, which performs video light luminance adjustment. Instead, an aspect in which the light quantity control section 291 only includes the outside light transmittance control section TC and therefore does not perform the video light quantity control described above is also conceivable.

In the example described above, the primary control section 290 (light quantity control section 291) performs the light quantity control in the outside light priority mode, but the light quantity control may be performed irrespective of the priority mode. That is, in the above description, the light quantity control can be switched in accordance with the priority mode, the outside light priority mode or the video light priority mode, by way of example. Instead, an aspect in which the outside light priority mode or the video light priority mode is not be provided and the transmittance of the shade is adjusted simply in accordance with the state of the outside light may be employed.

Second Embodiment

A transmissive display apparatus according to a second embodiment will be described below. The present embodiment is a variation of the transmissive display apparatus according to the first embodiment and is the same as the first embodiment except items about the light control shade, and no overall detailed description of the present embodiment will therefore be made.

Figure 11:
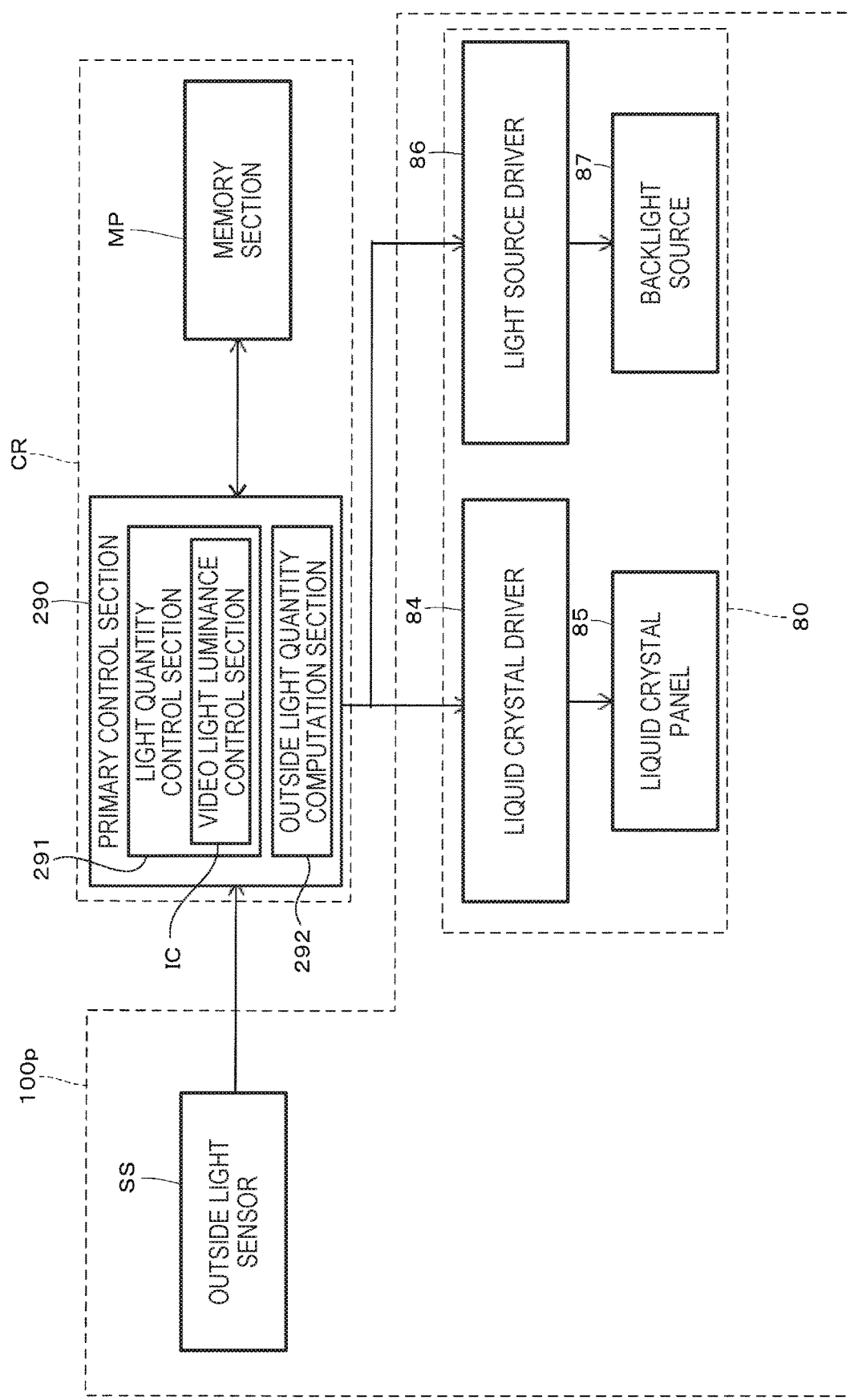
FIG. 11 is a block diagram for describing an example of control performed by a transmissive display apparatus according to a second embodiment.

FIG. 11 is a block diagram for describing a transmissive display apparatus 200 according to the present embodiment and corresponds to FIG. 5.

Comparison of FIG. 11 with FIG. 5 clearly shows that in the transmissive display apparatus 200 according to the present embodiment, the light quantity control section 291 of the primary control section 290 is provided with no outside light transmittance control section that adjusts the transmittance of the light control shade. In the present embodiment, the video light luminance control section IC, which forms the light quantity control section 291, controls the video light quantity. That is, the control illustrated in FIGS. 10A and 10B is performed.

In the present embodiment, the light control shade may, for example, not be provided or may be made, for example, of a resin material and have permanently fixed transmittance.

Figure 12:
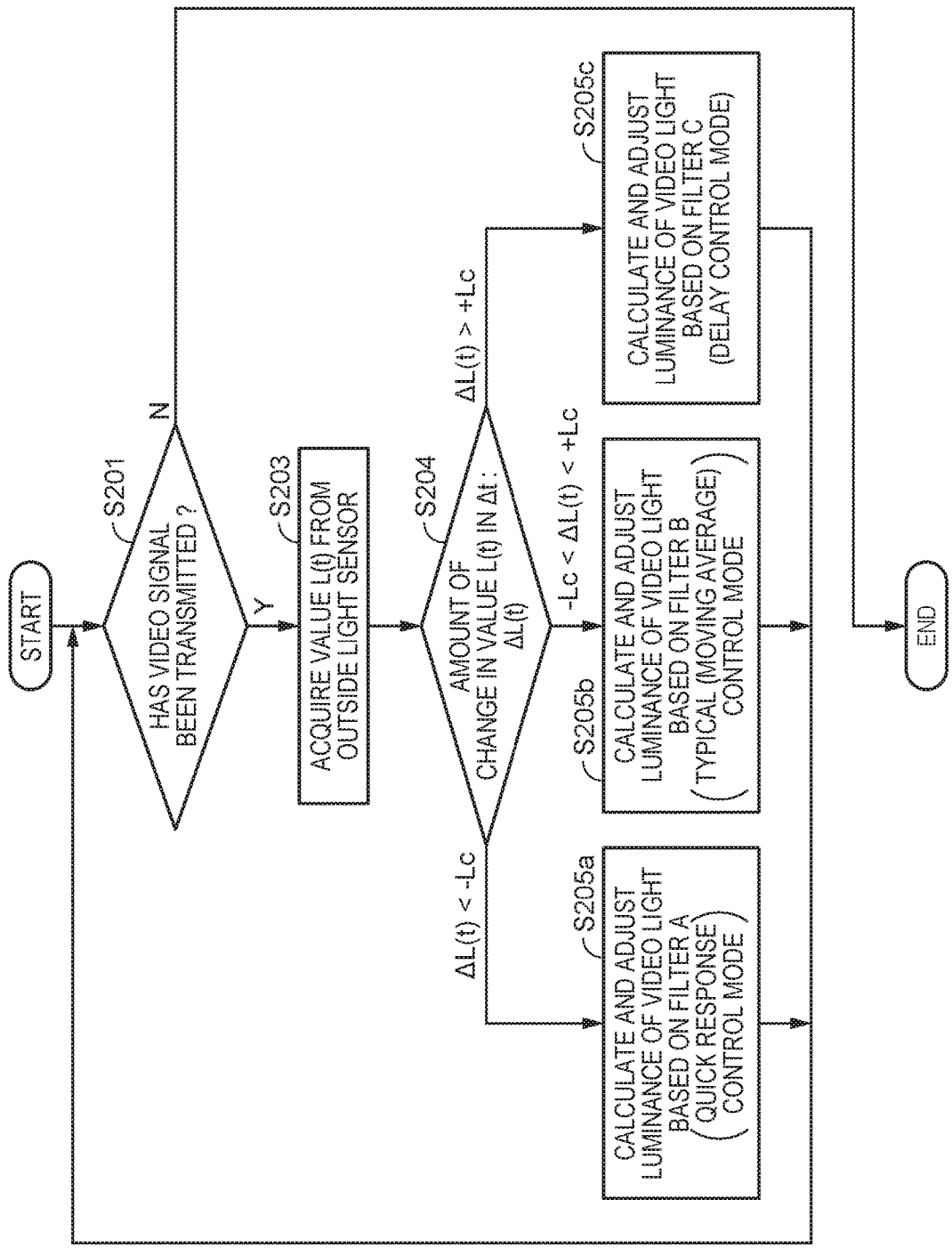
FIG. 12 is a flowchart for describing an example of control of the luminance of the video light.

Among a variety of types of control performed by the transmissive display apparatus 200, an example of light quantity control associated with the luminance of the video light from the image display apparatus 80 (video light control) will be described below with reference to the flowchart of FIG. 12.

When the transmissive display apparatus 200 starts operating, the primary control section 290 first checks whether or not a signal relating to the video light (hereinafter simply referred to as video signal) has been transmitted (step S201). When the light quantity control section 291 determines in step S201 that the video signal has been transmitted (Yes in step S201), the primary control section 290 reads the value L(t) measured with the outside light sensor SS (step S203) and calculates $\Delta L(t)=L(t)(t-L(t-\Delta t)$, which is the amount of change in the value L(t) in $\Delta t$ seconds (step S204). Further, in step S204, the primary control section 290 reads the threshold Lc (>0), which is a value determined in advance, compares the calculated value ΔL(t) with the threshold Lc. When the value ΔL(t) is smaller than the threshold Lc multiplied by −1, the primary control section 290 calculates a value for setting the luminance of the video light based on the filter A and adjusts the luminance of the video light accordingly (step S205a). That is, the primary control section 290 performs the quick response control. When the value ΔL(t) is greater than the threshold Lc multiplied by −1 but smaller than the threshold Lc (when absolute value of ΔL(t) is smaller than threshold Lc), the primary control section 290 calculates a value for setting the luminance of the video light based on the filter B and adjusts the luminance of the video light accordingly (step S205b). That is, the primary control section 290 performs the typical light quantity control. When the value ΔL(t) is greater than the threshold Lc, the primary control section 290 calculates a value for setting the luminance of the video light based on the filter C and adjusts the luminance of the video light accordingly (step S205c). That is, the primary control section 290 performs the delay control.

Having performed the calculation and control in any of steps S205a to S205c, the transmissive display apparatus 200 adjusts the luminance of the video light (video light quantity control) on the basis of the calculation and repeats the action in step S201 and the following steps until it is determined in step S201 that the transmission of the video signal is terminated (No in step S201).

As described above, the transmissive display apparatus 200 according to the present embodiment allows see-through observation in which video light and outside light are superimposed on each other for visual recognition of the superimposed light and further allows adjustment of the luminance of the video light (video light control) by changing the luminance of the video light in accordance with a change in the outside light quantity. In this case, in particular, when the outside light sensor SS, which is the outside light detection section, measures the outside light quantity and detects a decrease in the outside light quantity, the light quantity control section 291 of the primary control section 290 performs the quick response control, in which luminance adjustment is so performed that the luminance of the display sections DSa and DSb is quickly decreased (video light quantity control). As a result, a situation in which the video light becomes dominant in response to the decrease in the outside light quantity is avoided, whereby the outside can be visually recognized in a safer manner.

Others

The invention has been described with reference to the above embodiments, but the invention is not limited to the embodiments described above and can be implemented in a variety of other aspects to the extent that they do not depart from the substance of the invention.

In the above description, for example, the threshold Lc or any other value used to determine whether or not the quick response control is performed may be a single fixed value determined in advance or may instead be determined under another condition. That is, the threshold Lc may be determined stepwise on the basis, for example, of the degree of the outside light quantity, a function or table data for determining the threshold Lc may be stored in the memory section MP, and it may be determined whether or not the threshold Lc has been reached by referring to the function or the table data. Further, the threshold Lc, that is, the width of an increase or a decrease in brightness is used as the evaluation criterion, but the threshold Lc is not necessarily used. For example, a minimum or maximum value of the brightness (value L1 or L2 in above example) may be used as the threshold. For example, even when the threshold Lc is not reached but when a value measured with the outside light sensor SS in Δt becomes smaller than or equal to a preset minimum value, the transmittance may be forcibly increased. Further, the criterion in accordance with which the threshold Lc is set in the case where a decrease in the outside light quantity is detected may differ from the criterion in accordance with which the threshold Lc is set in the case where an increase in the outside light quantity is detected.

In the case where not only does the outside light transmittance control section TC control the outside light transmittance but also the video light luminance control section IC controls the luminance of the video light, the two types of control may be always performed in synchronization with each other, whereby the safety of the viewer can be ensured.

In the above description, in the first embodiment, the light control shade 90 can be implemented in a variety of other aspects. For example, it is conceivable to use a TFT liquid crystal material or any other type of liquid crystal material used in a transmissive liquid crystal panel. Use of the characteristics of a TFT liquid crystal material, for example, allows the quick response control to be reliably performed when the outside light quantity decreases. In this case, however, since a polarizing element is used, the quantity of the outside light, which contains light components having a variety of polarization states, decreases when the outside light passes through the polarizing element. To address the problem, the light control shade 90 may be formed by using an SPD, an electrochromic device, or a guest-host liquid crystal or polymer dispersed liquid crystal device described above. In this case, it is expected, for example, to improve the maximum outside light transmittance while the quick response control can be performed when the outside light quantity decreases and suppress electric power consumed when the light control shade 90 is driven. Further, for example, use of what is called a normally-white-type element that provides maximum transmittance when the light control shade 90, which is electrically driven, is not driven (when no voltage is applied to light control shade 90, for example) allows sufficient outside light quantity to be ensured, for example, even when the outside light quantity decreases but the light control shade 90 does not operate due to power source failure. As for the configuration of the light control shade 90, for example, a large number of thin louvers may be provided and the transmittance of the light control shade 90 may be adjusted by driving the louvers, or a DLP element may be used and turned on and off at high speed for high-speed opening and closing and the transmittance of the light control shade 90 may be adjusted by adjustment of the duty ratio of the opening/closing operation. The transmittance is not necessarily so controlled that it changes from white (maximum transmittance) to black (minimum transmittance) as described above. For example, the state of ground glass may be achieved, that is, the degree of scatter of light may be adjusted.

In the example described above, the primary control section 290 of the controller CR controls the action of the light control shade 90. Instead, for example, the light control shade 90 may be provided with the function corresponding to the outside light transmittance control section TC, which forms the light quantity control section 291 of the primary control section 290, and the function corresponding to the outside light quantity computation section 292, which forms the primary control section 290, and the light control shade 90 may receive a signal from the outside light sensor SS and perform the transmittance adjustment. The light control shade 90 may further be provided with the outside light sensor SS. That is, the light control shade 90 may be present as a single apparatus (light control shade apparatus), so to speak, and may form a light control shade that can be used with an existing transmissive display apparatus (virtual image display apparatus).

Figure 13A:
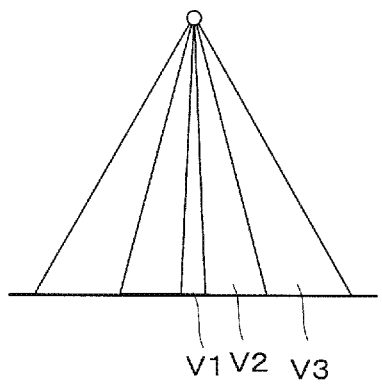
FIGS. 13A to 13C are conceptual diagrams for describing a viewer's visual field.
Figure 13B:
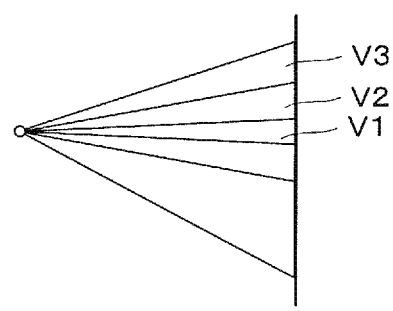
Figure 13C:
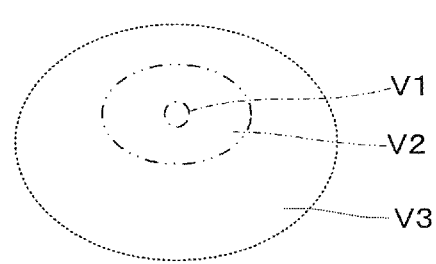
Figure 14B:
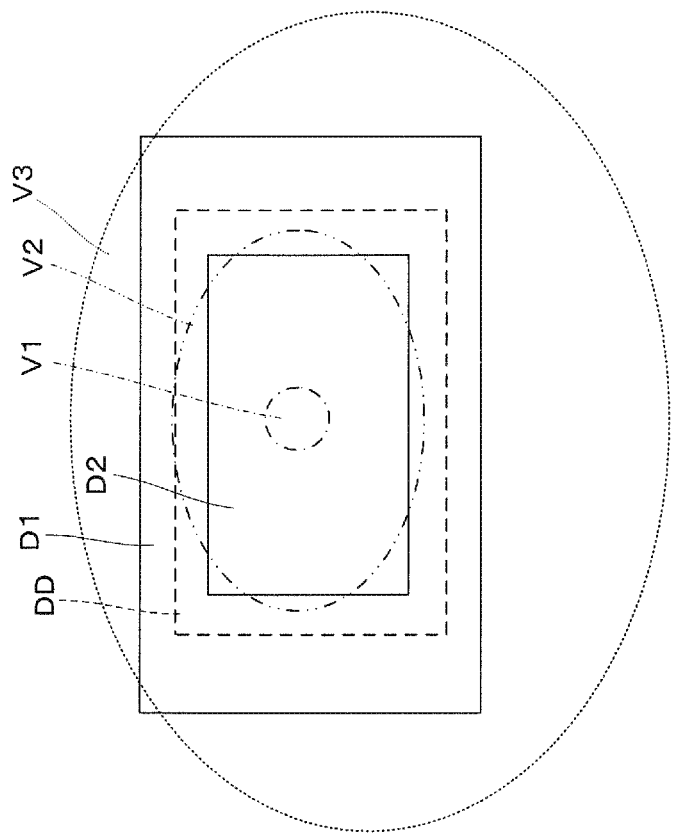
FIG. 14A conceptually shows an example of a light quantity control area where light quantity control in a light control area of the light control shade and a video image display area of a display section is performed, and FIG. 14B conceptually shows an example of the range of the viewer's visual field relative to the areas in FIG. 14A.
Figure 14A:
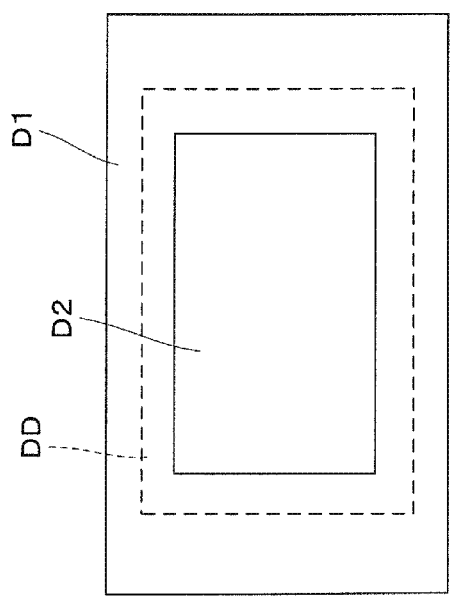

The aspect of the outside light sensor SS and the range of the light quantity control may be set in a variety of manners. In the configuration using an ambient sensor that senses brightness of outside light in the direction of the viewer's sight line, the light quantity control may be performed further in consideration of the range of the viewer's visual field, as shown, for example, in FIGS. 13A to 13C and FIGS. 14A and 14B. Specifically, FIGS. 13A to 13C are conceptual diagrams for describing the viewer's visual field. FIG. 13A shows a horizontal visual field. FIG. 13B shows a vertical (perpendicular) visual field. FIG. 13C shows a visual field projected on a surface (expanse of visual field in a plane viewed along sight line direction). In FIGS. 13A to 13C, a discrimination visual field V1, which is the narrowest visual field, is a central area where excellent vision and other visual functions are achieved (within about 5°), an effective visual field V2, which is the second narrowest visual field, is an area where information need can be instantly satisfied only with eyeball motion (within about 30° horizontally and about 20° vertically), and a stable fixation visual field V3, which is the widest visual field, is an area where fixation is comfortably achieved with eyeball/head motion and effective information need can be satisfied (within 60° to 90° horizontally and 45° to 70° vertically). Providing the outside light sensor SS oriented in the direction of the viewer's sight line with directivity to perform sensing over the range including the visual fields V1 to V3 and performing the light quantity control over a range at least wider than the discrimination visual field V1 among the visual fields V1 to V3 allow safe visual recognition of the outside. It is believed that a minimum required range can thus be covered. FIGS. 14A and 14B are conceptual diagrams for showing an example of the relationship between the viewer's visual field described above and the range over which the light quantity control should be performed. FIG. 14A conceptually shows an example of a light quantity control area DD, which is an in-front-of-eye portion of each of the display sections DSa and DSb and where the light quantity control should be performed in association with a light control area D1, where the light control shade 90 performs light control (area where light control shade 90 covers in-front-of-eye portion), and a video image display area D2, where video images formed by the video light are displayed (an imaginary area recognized by the viewer as if a virtual image were present in the area or an area equivalent to the image display area of the liquid crystal panel 85 corresponding to the imaginary area). That is, it is assumed that the quick response control and the delay control described above are performed at least over the range of the light quantity control area DD. The range of the light quantity control area DD is so configured in the example shown in FIG. 14B that the light quantity control area DD contains the discrimination visual field V1 and the effective visual field V2 among the viewer's visual fields, as shown in FIG. 14B. As shown in FIG. 14A, the light quantity control area DD is narrower than the light control area D1 but wider than the video image display area D2. This means that the transmittance control performed by the light control shade 90 is performed in a central area of the light control shade 90, and that the video light luminance control is performed over the entire area of the liquid crystal panel 85 of the image display apparatus 80. It is noted that the areas of the visual fields V1 to V3 can be determined in a variety of aspects. For example, in an aspect in which the viewer's sight line is also measured, it is conceivable to determine areas corresponding to the visual fields V1 to V3 on the basis of the center of the sight line, and in an aspect in which the sight line is not measured, it is conceivable to determine the areas with respect to the center position of the video image display area D2 (center position of image display area of liquid crystal panel 85).

The light quantity control area DD described above is not necessarily determined in consideration of the viewer's visual field and can instead be determined from a variety of other viewpoints. For example, the video light luminance control is also applicable to a head-up display (for example, head-up display provided by using windshield of automobile) as well as a head mounted display. In this case, for example, it is also conceivable that among a plurality of video image display areas, a video image display area where the viewer desires that video image display always has higher priority than visual recognition of the outside is so configured as not to contain the light quantity control area DD so that a situation in which the viewer is unable to view displayed video images is avoided. Further, in the control of the light control shade on the assumption that the visual field is so ensured to some extent as to contain the entirety of the outside, it is conceivable that the transmittance of a portion of the light control area D1 is intentionally so changed that the outside is invisible through the portion or the light control shade is provided with a separate display function and caused to display another image in the portion. In the latter case, for example, it is conceivable that the molecular structure of the liquid crystal material or any other material that forms the light control shade is colored and the colored structure is used to display another image.

Figure 15:
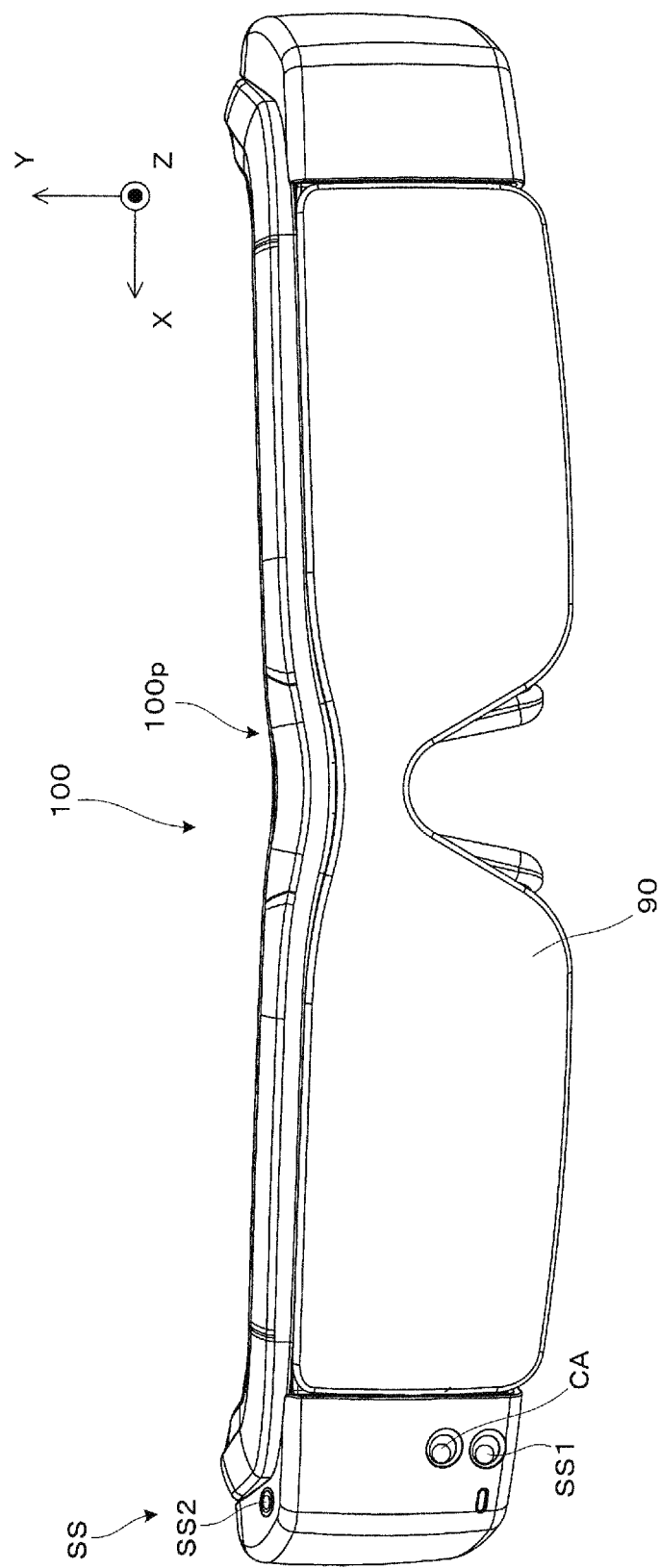
FIG. 15 is a front view showing another example of the transmissive display apparatus.

The outside light sensor SS may instead be configured in an aspect in which a first sensor SS1 and a second sensor SS2 oriented in two different directions as well as a camera CA disposed in the vicinity of the first sensor SS1 are provided, as illustrated in FIG. 15. First, the first sensor SS1 is so provided as to be aligned with the direction of the viewer's sight line, as described above. On the other hand, the second sensor SS2, which is the other sensor, senses the situation in the direction toward the upper side of the viewer (direction toward the top of the head, +Y direction in the state shown in FIG. 15) as the situation in the upward direction with respect to the viewer to be taken into account in the brightness evaluation. The outside brightness may be determined on the basis of results of the two types of sensing. Further, the camera CA can perform imaging in roughly the same direction in which the first sensor SS1 is oriented and performs imaging over the detection range of the first sensor SS1 and/or the vicinity of the detection range to acquire image information. In the brightness sensing, the image information may be used as information for determining the sensing range of the sensor SS1. That is, in the computation performed by the outside light quantity computation section 292, the situation of the outside light may be evaluated on the basis of the image information acquired in the image capturing performed by the camera CA, and the amount of light quantity to be adjusted may be determined on the basis of a result of the evaluation. For example, when a bright area and a dark area are both present in the sensing range, averaging or any other operation can be performed on the basis of the image information. Further, in the above description, the second sensor SS2 is used to sense the situation in the direction toward the upper side of the viewer as the situation in the upward direction with respect to the viewer to be taken into account in the brightness evaluation. Instead, for example, a gyro sensor may be mounted on the apparatus and may sense the situation in the upward direction against gravity as the upward direction with respect to the viewer. Further, the type of the camera CA can be a variety of types. For example, it is conceivable to use a camera that can perform imaging in the visible light area, an IR camera, or any other special camera. Moreover, for example, the range (area) over which the camera CA performs imaging may be a wider area including the detection range of the first sensor SS1 and/or the vicinity thereof. In this case, it is conceivable to extract and use part of the area of a captured image as an image of the detection range and the vicinity thereof.

In addition to the gyro sensor described above, whether or not the light quantity control should be performed (whether or not mode is switched) may be determined by estimation based on movement of the viewer or swing motion or any other type of motion of the viewer's head detected with an acceleration sensor, position detection performed by a GPS or any other system, or any other information. Further, the mode may be switched in accordance with the size of the display area on which video images are displayed. In addition, the degrees of changes in the transmittance of the light control shade and the luminance or any other factor of the video light may be adjusted in accordance with light adaptation/dark adaptation.

The method for checking whether the light control shade 90 is attached to or removed from the apparatus can be a variety of methods. As the simplest method, it is conceivable to use contact between metal terminals that serve as a wiring line for transmitting a transmittance-related signal set in the primary control section 290, as shown by way of example in FIGS. 16A and 16B. That is, an attachment hole section (location where light control shade 90 comes into contact with main body portion 100p) CV, which is provided in the main body portion 100p and into which the light control shade 90 is attached, and a protruding section TP, which is provided on the light control shade 90 in correspondence with the attachment hole section CV, are provided with metal terminals 100m and 90m, respectively, as shown in FIG. 16A, and the light control shade 90 is attached into the attachment hole section CV and hence the metal terminals 100m come into contact with the metal terminal 90m so that communication is established (electricity is conducted), as shown in FIG. 16B. The light control shade 90 can thus be detected. In this case, an aspect in which changing the electricity conduction state in accordance with the type of the light control shade 90 allows detection of the type of the light control shade 90 may be employed.

The above description has been made of image display performed by the image display apparatus 80 formed of a liquid crystal panel or any other component by way of example. In addition to the case described above, for example, the image display apparatus 80 may be formed of an OLED (organic EL), which is a self-luminous element, as a light emitting source. Further, for example, a configuration using a reflective liquid crystal display device is conceivable, and a digital micromirror device or any other device can be used in place of the video display element 82 formed, for example, of a liquid crystal display device. An LED array can, for example, be used as the self-luminous element.

In the embodiment described above, the panel-type image display apparatus 80 including an OLED (organic EL) is used, and a sweep-type image display apparatus can be used in place of the image display apparatus 80. Specifically, for example, a light diffusion element is disposed in an image plane OI, and a sweep-type illumination system is used to sweep light in the position of the image plane OI to form an image, which is outputted in the form of video light on the basis of the diffusion effect of the light diffusion element. The same configuration described above can thus be used.

The invention of the present application may be applied to an aspect in which a screen, a micromirror array, or any other component is used in front of the eyes to present a real image. Further, in a case where an object in a displayed image exists in the outside, light reflected off the object toward the viewer may be created in a simulation, and the viewer is allowed to view holographic video images based on a result of the simulation as if the target were present in front of the viewer.

In the above description, an intermediate image corresponding to an image displayed on the video image display element 82 is formed in the light guide member 10. The invention is also applicable to a transmissive display apparatus that guides light without forming an intermediate image.

In the above description, the half-silvered mirror layer 15 is a simple semi-transmissive film (dielectric multilayer film). The half-silvered mirror layer 15 can be replaced with a planar or curved hologram element.

The above description has been made of the transmissive display apparatus 100 including the pair of display apparatus 100A and 100B. The transmissive display apparatus 100 can instead be formed of a single display apparatus. That is, instead of providing the set of the projection/see-through apparatus 70 and the image display apparatus 80 in correspondence with each of the right and left eyes, only one of the right and left eyes may be provided with the projection/see-through apparatus 70 and the image display apparatus 80 for monocular image view.

In the above description, the light guide member 10 and other components extend in the horizontal direction along which the eyes EY are arranged. The light guide member 10 may instead extend in the vertical direction. In this case, the light guide member 10 has a parallel arrangement structure instead of the serial arrangement structure.

Figure 2:
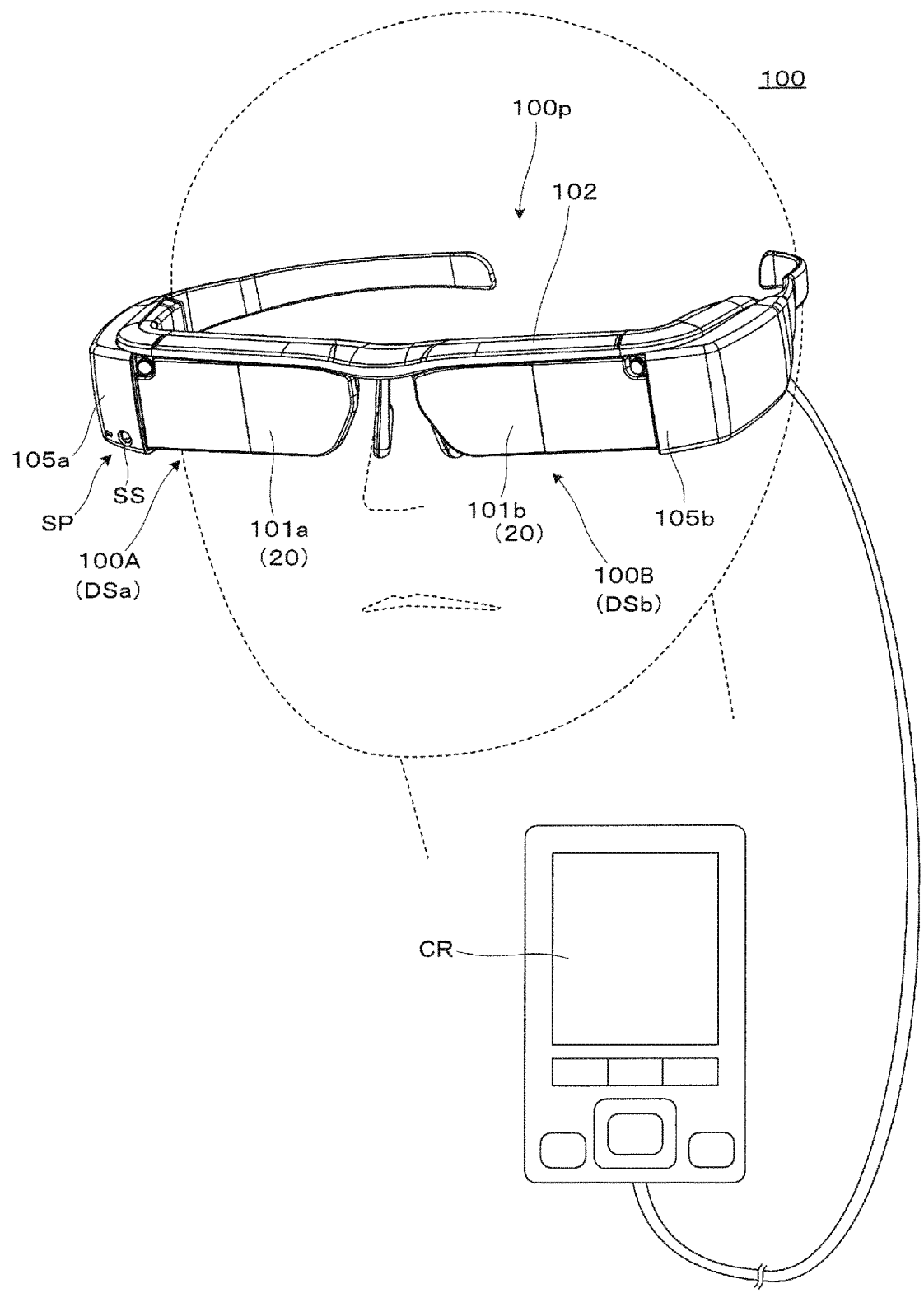
FIG. 2 is a perspective view showing the exterior appearance of the transmissive display apparatus with a light control shade removed therefrom.

In the above description, the light control shade 90 covers the viewer's entire visual field on the front side of the apparatus, as shown in FIG. 2 and other figures, but the light control shade 90 does not necessarily cover the viewer's entire visual field and may cover part of the viewer's visual field, such as the half-silvered mirror portion (half-silvered mirror layer 15, see FIG. 4) and other components. Further, in the above description, the light control shade 90 uniformly adjusts the transmittance over the entire light control area in a collective manner. Instead, for example, the light control area may be divided into a plurality of areas, and the transmittance may vary in each of the areas. More specifically, for example, the transmittance of the half-silvered mirror portion (half-silvered mirror layer 15) may differ from the transmittance of the other outside light transmissive portion.

In the above description, as an example of a configuration in which the video light is adjusted on the basis of a result of the sensing performed by a sensor section SP, the outside light sensor SS senses, among the components of the outside light, components corresponding to those that reach the viewer's eyes and transmits a result of the sensing to the primary control section 290 of the controller CR. A result of the sensing is not necessarily transmitted in the form of digital data, and a variety of other aspects are conceivable. Further, for example, a case where an analog voltage changes in accordance with the quantity of light incident on the sensor section SP and the analog change is A/D-converted and detected by the primary control section 290 may be conceivable, and an aspect in which data is held in a memory in the sensor SP and the primary control section 290 reads the data may be employed.

In the above description, the controller CR, which is provided separately from the main body portion 100p and wired thereto, incorporates the control sections and the memory section by way of example. It is conceivable to employ a variety of other aspects of the configurations of the primary control section, the memory section, and other sections. For example, the primary control section and the memory section may be provided in the main body portion 100p, which is mounted on the head. Further, an aspect in which the function of the controller CR is incorporated into a wearable instrument of a wristwatch type or any other type, or an information processing apparatus, such as a smartphone, is also conceivable. Moreover, an aspect in which the function of detecting outside light is incorporated, for example, into an instrument other than the main body portion 100p, such as a wearable instrument, and capable of detecting outside light in the direction of the viewer's sight line is also conceivable.

The invention is applicable to a variety of display apparatus including a display section having an optically see-through configuration (configuration in which an optical effect on outside light, such as the optical effect of a half-silvered mirror, is used to allow visual recognition of the outside light) and may be implemented as an optically see-through display apparatus that does not use the light guide member described above.

The entire disclosure of Japanese Patent Application No. 2015-192905, filed Sep. 30, 2015 is expressly incorporated by reference herein.

What is claimed is:

1. A see-through display apparatus comprising:
an image display apparatus configured to emit a video light;
a light guide apparatus configured to guide the video light and to output the video light in a first direction; and
a light control shade disposed opposite to the first direction with respect to the light guide apparatus and configured to control a transmittance of an outside light based on a luminance of the outside light, wherein
a first response time of the light control shade when the outside light changes from a lower luminance to a higher luminance is slower than a second response time of the light control shade when the outside light changes from the higher luminance to the lower luminance,
a magnitude of change in the luminance over a predetermined period of time is calculated and is compared to a predetermined threshold value, and, based on the comparison, the light control shade applies a filter of a plurality of filters to adjust the response time of control of the transmittance of the outside light,
the light control shade is configured to change the transmittance of the outside light between a first transmittance value and a second transmittance value, and the light control shade applies the filter throughout the control of the transmittance between the first transmittance value and the second transmittance value,
a value for setting the transmittance of the outside light by the light control shade is calculated based on the applied filter, and the transmittance is adjusted based on the calculated value,
the plurality of filters includes an unweighted moving average filter and a weighted filter, and
application of the weighted filter results in an instantaneous increase in the transmittance of the outside light which is faster than an increase in the transmittance of the outside light resulting from application of the unweighted moving average filter.

2. The see-through display apparatus according to claim 1, wherein the transmittance of the outside light by the light control shade is lower when the outside light has a higher luminance than the transmittance of the outside light by the light control shade when the outside light has a lower luminance.

3. A see-through display apparatus comprising:
an image display apparatus configured to form a video light;
a light guide apparatus configured to guide the video light and to output the video light in a first direction; and
a light control shade disposed opposite to the first direction with respect to the light guide apparatus and configured to control a transmittance of an outside light based on a luminance of the outside light,
wherein:
the transmittance of the outside light by the light control shade is decreased when the luminance of the outside light increases during a first period of time,
the transmittance of the outside light by the light control shade is increased when the luminance of the outside light decreases during a second period of time, the second period of time having a duration equal to a duration of the first period of time,
an absolute value of a change of the transmittance during the first period of time is less than an absolute value of a change of the transmittance during the second period of time,
a magnitude of change in the luminance over a predetermined period of time is calculated and is compared to a predetermined threshold value, and, based on the comparison, the light control shade applies a filter of a plurality of filters to adjust a response time of control of the transmittance of the outside light,
the light control shade is configured to change the transmittance of the outside light between a first transmittance value and a second transmittance value, and the light control shade applies the filter throughout the control of the transmittance between the first transmittance value and the second transmittance value,
a value for setting the transmittance of the outside light by the light control shade is calculated based on the applied filter, and the transmittance is adjusted based on the calculated value,
the plurality of filters includes an unweighted moving average filter and a weighted filter, and
application of the weighted filter results in an instantaneous increase in the transmittance of the outside light which is faster than an increase in the transmittance of the outside light resulting from application of the unweighted moving average filter.

4. A see-through display apparatus comprising:
an image display apparatus configured to form a video light; and
a light control shade configured to:
modulate an outside light that is incident from a first side of the light control shade, and
transmit the modulated light toward an opposite side of the first side of the light control shade,
wherein:

the video light and the modulated light are transmitted so as to be superimposed and incident on a pupil of an eye of a viewer, the light control shade has a higher transmittance ratio when a luminance of outside light is lower than a transmittance ratio when a luminance of outside light is higher, a magnitude of change in the luminance over a predetermined period of time is calculated and is compared to a predetermined threshold value, and, based on the comparison, the light control shade applies a filter of a plurality of filters to adjust a response time of control of a transmittance of the outside light, the light control shade is configured to change the transmittance of the outside light between a first transmittance value and a second transmittance value, and the light control shade applies the filter throughout the control of the transmittance between the first transmittance value and the second transmittance value, a value for setting the transmittance of the outside light by the light control shade is calculated based on the applied filter, and the transmittance is adjusted based on the calculated value, the plurality of filters includes an unweighted moving average filter and a weighted filter, and application of the weighted filter results in an instantaneous increase in the transmittance of the outside light which is faster than an increase in the transmittance of the outside light resulting from application of the unweighted moving average filter.

5. The see-through display apparatus according to claim 4, further comprising a light guide apparatus configured to be positioned between the light control shade and the viewer's eye, wherein the light guide is configured to guide the video light and to output the video light so as to direct the video light toward the pupil of the eye of the viewer.

6. The see-through display apparatus according to claim 1, further comprising a first ambient light sensor configured to detect the luminance of the outside light in a direction of a sight line of a viewer; and a second ambient light sensor configured to detect the luminance of the outside light in an upward direction with respect to the viewer, wherein the light control shade controls the transmittance of the outside light based on the luminance of the outside light detected by the first ambient light sensor and the second ambient light sensor.

7. The see-through display apparatus according to claim 3, further comprising a first ambient light sensor configured to detect the luminance of the outside light in a direction of a sight line of a viewer; and a second ambient light sensor configured to detect the luminance of the outside light in an upward direction with respect to the viewer, wherein the light control shade controls the transmittance of the outside light based on the luminance of the outside light detected by the first ambient light sensor and the second ambient light sensor.

8. The see-through display apparatus according to claim 4, further comprising a first ambient light sensor configured to detect the luminance of the outside light in a direction of a sight line of the viewer; and a second ambient light sensor configured to detect the luminance of the outside light in an upward direction with respect to the viewer, wherein the light control shade controls the transmittance of the outside light based on the luminance of the outside light detected by the first ambient light sensor and the second ambient light sensor.

9. The see-through display apparatus according to claim 1, wherein different filters are applied based on different comparison results between the magnitude of change and the predetermined threshold value.

* * * * *